United States Patent
Kawano

[11] Patent Number: 5,877,806
[45] Date of Patent: Mar. 2, 1999

[54] IMAGE SENSING APPARATUS FOR OBTAINING HIGH RESOLUTION COMPUTER VIDEO SIGNALS BY PERFORMING PIXEL DISPLACEMENT USING OPTICAL PATH DEFLECTION

[75] Inventor: Kenji Kawano, Tokyo, Japan

[73] Assignee: Ohtsuka Patent Office, Tokyo, Japan

[21] Appl. No.: 550,028

[22] Filed: Oct. 30, 1995

[30] Foreign Application Priority Data

Oct. 31, 1994 [JP] Japan .................................. 6-267062
Oct. 31, 1994 [JP] Japan .................................. 6-267063

[51] Int. Cl.⁶ .................................................. H04N 5/225
[52] U.S. Cl. .......................................... 348/219; 348/340
[58] Field of Search ................................ 348/222, 260, 348/264, 374, 218, 231, 312, 359, 202, 203, 195, 219, 340, 322, 320; 250/216, 208.1; 359/197, 223, 226, 198–203; H04N 5/225

[56] References Cited

U.S. PATENT DOCUMENTS

| | | | |
|---|---|---|---|
| 4,383,170 | 5/1983 | Takagi et al. | 250/216 |
| 4,589,030 | 5/1986 | Kley | 358/212 |
| 4,633,317 | 12/1986 | Uwira et al. | 358/213 |
| 4,652,928 | 3/1987 | Endo et al. | 348/219 |
| 4,797,749 | 1/1989 | Paulsen | 358/302 |
| 4,960,313 | 10/1990 | Yamanaka | 350/6.1 |
| 5,182,671 | 1/1993 | Kitagishi et al. | 359/557 |
| 5,299,049 | 3/1994 | Saito et al. | 359/196 |
| 5,386,628 | 2/1995 | Hartman et al. | 29/890.01 |
| 5,504,612 | 4/1996 | Cobb et al. | 359/202 |
| 5,543,954 | 8/1996 | Nicholson | 359/201 |
| 5,557,327 | 9/1996 | Hasegawa et al. | 348/219 |
| 5,754,226 | 5/1998 | Yamada et al. | 348/219 |
| 5,786,901 | 7/1998 | Okada et al. | 348/219 |

FOREIGN PATENT DOCUMENTS 303472 10/1994 Japan .......................... H04N 5/225

Primary Examiner—Michael Lee
Attorney, Agent, or Firm—Morgan & Finnegan, LLP

[57] ABSTRACT

An image sensing apparatus which can increase the image information amount by performing a pixel displacement by rotating a deflector for changing the optical path of image light incident on an image sensing element about two orthogonal axes (axes A and B) using two cams. The two cams are arranged on one side with respect to the axis B, and are driven by a single motor. Cam surfaces for canceling an interference are formed in advance on the two cams.

40 Claims, 35 Drawing Sheets

F I G. 11A  F I G. 11B
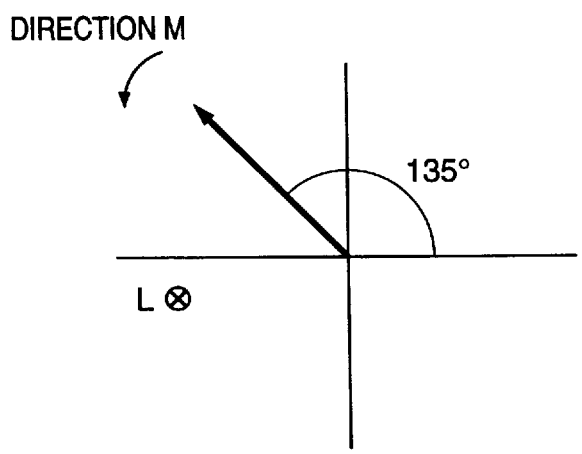
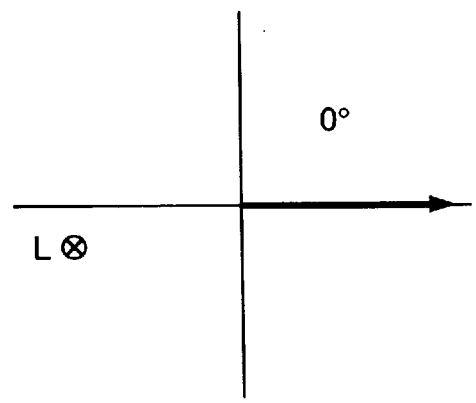
F I G. 11C
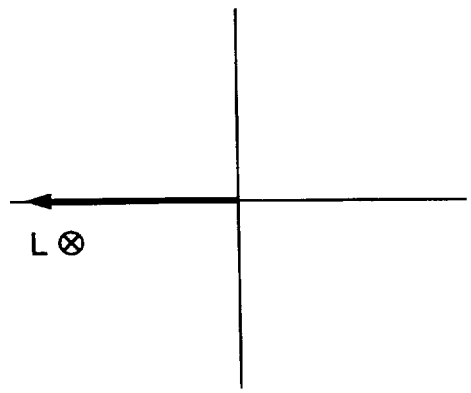

FIG. 15

CCD FRONT SURFACE

| N=4<br>4<br>(Fx1,Fy4) | N=5<br>5<br>(Fx2,Fy5) | N=12<br>12<br>(Fx3,Fy12) | N=13<br>13<br>(Fx4,Fy13) |
|---|---|---|---|
| N=3<br>3<br>(Fx1,Fy3) | N=6<br>6<br>(Fx2,Fy6) | N=11<br>11<br>(Fx3,Fy11) | N=14<br>14<br>(Fx4,Fy14) |
| N=2<br>2<br>(Fx1,Fy2) | N=7<br>7<br>(Fx2,Fy7) | N=10<br>10<br>(Fx3,Fy10) | N=15<br>15<br>(Fx4,Fy15) |
| N=1<br>1<br>(Fx1,Fy1) | N=8<br>8<br>(Fx2,Fy8) | N=9<br>9<br>(Fx3,Fy9) | N=16<br>16<br>(Fx4,Fy16) |

FIG. 20

CCD FRONT SURFACE

| 4<br>(Fm7,Fm8) | 5<br>(Fm9,Fm10) | 12<br>(Fm23,Fm24) | 13<br>(Fm25,Fm26) |
|---|---|---|---|
| 3<br>(Fm5,Fm6) | 6<br>(Fm11,Fm12) | 11<br>(Fm21,Fm22) | 14<br>(Fm27,Fm28) |
| 2<br>(Fm3,Fm4) | 7<br>(Fm13,Fm14) | 10<br>(Fm19,Fm20) | 15<br>(Fm29,Fm30) |
| 1<br>(Fm1,Fm2) | 8<br>(Fm15,Fm16) | 9<br>(Fm17,Fm18) | 16<br>(Fm31,Fm32) |

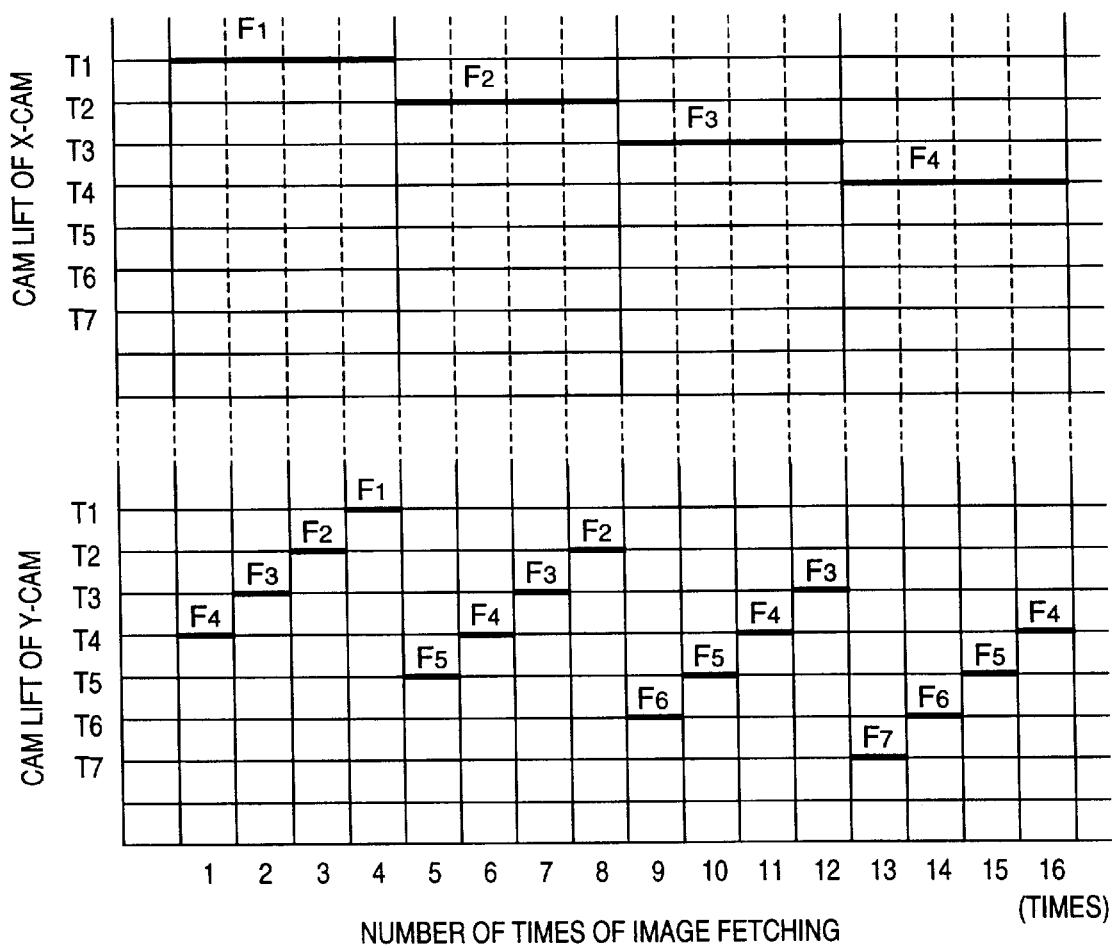

IMAGE SENSING APPARATUS FOR OBTAINING HIGH RESOLUTION COMPUTER VIDEO SIGNALS BY PERFORMING PIXEL DISPLACEMENT USING OPTICAL PATH DEFLECTION

BACKGROUND OF THE INVENTION

The present invention relates to an image sensing apparatus and, more particularly, to an image sensing apparatus which obtains a high-resolution computer video signal by performing a so-called pixel displacement using optical path deflection means such as a parallel glass plate.

In recent years, video cameras are widely used as image input apparatuses or image sensing apparatuses for computers. In particular, a system as a combination of a video camera and a computer (e.g., a personal computer or workstation) is used as a DTP (Desktop publishing) system, a video electronic mailing system, a video meeting system, and the like.

Of these apparatuses, high-resolution image input apparatuses have been recently developed for use with an HDTV (High-definition television). Using such apparatuses, character and image data are edited and information is exchanged using high-definition images.

As an image input apparatus or an image sensing apparatus which can be used for such a system, an image sensing element having a large number of pixels is required to obtain a high resolution.

However, the number of pixels of the image sensing element of most existing video cameras is as small as about 250,000 to 400,000 pixels (although some elements have 580,000 pixels), and it is difficult to obtain a high-definition image. Such video cameras cannot be applied to the HDTV. Although high-resolution video cameras for a special purpose have been commercially available, they are not suitable for domestic equipment due to very expensive image sensing elements.

However, in recent years, a system which uses an image sensing element having about 400,000 pixels, and increases optical image information incident on the image sensing element by shifting the optical path by displacing the image sensing element or some lenses in the lens system so as to attain a high resolution has become commercially available. Owing to such a system, the price of an image input apparatus or an image sensing apparatus which can be applied to the HDTV is lowering.

The high-resolution system obtains a high resolution by a so-called pixel displacement using a parallel glass plate. The system will be briefly described below with reference to FIG. 1A.

Referring to FIG. 1A, reference numeral 201 denotes lenses for guiding an optical image from an object toward an image sensing element 202; 202, an image sensing element for converting the optical image into an electrical signal; 203, a holding frame which has rotation shafts 205 and 206 serving as the fulcrums of rotation at its two end portions in the horizontal direction, and holds a deflector 204; and 204, a parallel glass plate (deflector) which is fixed at the central portion of the holding frame 203. When the holding frame 203 rotates about the rotation shafts 205 and 206 as the center of rotation using a driving source (not shown), the parallel glass plate 204 disposed at the central portion of the holding frame 203 rotates (in the directions of an arrow a) in correspondence with the driving operation, thereby displacing incident light rays in the vertical direction.

A mechanism for a pixel displacement in the horizontal direction has a similar arrangement. More specifically, reference numeral 207 denotes a holding frame which has rotation shafts 209 and 210 serving as the fulcrums of rotation at its two end portions in the horizontal direction, and holds a deflector 208; and 208, a parallel glass plate (deflector) fixed at the central portion of the holding frame 207. When the holding frame 207 rotates about the rotation shafts 209 and 210 as the center of rotation using a driving source (not shown), the parallel glass plate 208 disposed at the central portion of the holding frame 207 rotates (in the directions of an arrow b) in correspondence with the driving operation, thereby displacing incident light rays in the horizontal direction.

FIG. 1B shows the relationship between the horizontal and vertical directions (X- and Y-directions) of the image sensing element 202, and a "Y-direction displacement effect" brought about by the rotation direction (the direction a) of the glass plate 203 and an "X-direction displacement effect brought about by the rotation direction (the direction b) of the glass plate 208. More specifically, when the glass plate 203 is rotated in the direction b, a pixel displacement is attained in the X-direction of the image pickup element 202; when the glass plate 208 is rotated in the direction a, a pixel displacement is attained in the Y-direction of the image pickup element 202.

Reference numeral 211 denotes an optical low-pass filter which changes the frequency characteristic of optical image information by utilizing the double refraction effect of a quartz. The low-pass filter 211 is normally constituted by at least two quartz plates. Of the frequencies of transmission light, one quartz plate of the low-pass filter 211 changes the frequency in the horizontal direction, and the other quartz plate in the vertical direction. The filter 211 is arranged in front of the image sensing element 202. Furthermore, the separation width of ordinary and extraordinary light rays generated by the double refraction effect of the quartz plates is appropriately set in advance in correspondence with the number of pixels and the arrangement of pixels of the image sensing element 202, a signal processing circuit, and the like.

A mechanism for displacing the optical path using the parallel glass plates 203 and 208 will be explained below with reference to FIGS. 2A and 2B. FIG. 2A shows a state wherein a parallel glass plate 221 is located parallel to the optical axis principal plane (in the plane), and FIG. 2B shows a state wherein the parallel glass plate 221 is displaced through an angle θ from the state shown in FIG. 2A.

Referring to FIGS. 2A and 2B, the glass plate 221 has a thickness d in the optical axis direction. Reference numeral 222 denotes incident light which becomes incident on the parallel glass plate 221; and 223, exit light which emerges from the parallel glass plate 221. The displacement amount, δ, of the optical path by the parallel glass plate 221 is given by:

$$\delta = \left\{ 1 - (1-N) \cdot \frac{\cos\phi}{\cos\phi'} \right\} \cdot d \cdot \sin\phi \qquad \text{(Eq. 1)}$$

where
  N: the refractive index of the parallel glass plate
  φ: the angle (incident angle) defined between the incident light and the plane normal
  φ': the angle defined between the incident light and the plane normal in the parallel glass plate
  If the incident angle φ is very small, since we have:
  cos φ=cos φ' sin φ≈φ
equation (1) above can be expressed by a simple approximation as follows:

$$\delta = \left(1 - \frac{1}{N}\right) \cdot d \cdot \phi \quad \text{(Eq. 2)}$$

Thus, if the displacement amount of the optical path in FIG. 2A is δ=δ$_1$, and the displacement amount of the optical path in FIG. 2B is δ=δ$_2$, the following relationships are established:

$$\delta_1 = \left(1 - \frac{1}{N}\right) \cdot d \cdot \phi_1 \quad \text{(Eq. 3)}$$

$$\delta_2 = \left(1 - \frac{1}{N}\right) \cdot d \cdot \phi_2 \quad \text{(Eq. 4)}$$

$$\phi_2 = \phi_1 + \theta$$

When the parallel glass plate is inclined through θ from the state shown in FIG. 2A (i.e., the state shown in FIG. 2B), the optical path change amount δ$_s$ is:

$$\begin{aligned}\delta_s &= \delta_2 - \delta_1 \quad \text{(Eq. 5)}\\ &= \left(1 - \frac{1}{N}\right) \cdot d \cdot (\phi_2 - \phi_1)\\ &= \left(1 - \frac{1}{N}\right) \cdot d \cdot \theta\end{aligned}$$

More specifically, when the parallel glass plate 221 is rotated through θ, the optical path changes by δ$_s$ in the principal plane. The above-mentioned principle of changing the optical path shown in FIGS. 2A and 2B applies to the glass plates 203 and 208 shown in FIG. 1A although their rotation directions are perpendicular to each other.

An example of the pixel arrangement and aperture of the image sensing element 202 will be briefly described below with reference to FIGS. 3A and 3B.

Referring to FIG. 3A, reference symbol H denotes a horizontal scanning direction for the image sensing element 202; and V, a vertical scanning direction. On one of two adjacent horizontal lines, yellow filters Y and magenta filters M are alternately disposed at a pixel interval p$_h$ in the horizontal scanning direction, and on the next line, cyan filters C and green filters G are also alternately disposed at the pixel interval p$_h$. These lines are alternately disposed at a pixel interval p$_v$ in the vertical scanning direction.

If the thickness d of each parallel glass plate is set so that the displacement amount of the optical path becomes ½ the pixel size, i.e., ½·p$_h$ and ½·p$_v$ when the above-mentioned parallel glass plates 203 and 208 are inclined through the angle θ, a x16 image information amount can be obtained by changing the optical path four times in the horizontal direction and four times in the vertical direction, as shown in FIG. 3B, thus attaining a high resolution using a conventional image sensing element with a small number of pixels.

In the image sensing apparatus shown in FIG. 1A, the mechanism for the pixel displacement in the horizontal direction is completely separated from that for the pixel displacement in the vertical direction, and the two parallel glass plates 203 and 208 can be operated independently.

However, in the conventional arrangement shown in FIG. 1A, since the two independent parallel glass plates are juxtaposed in the optical axis direction, the total lens length increases due to an increase in thickness in the optical axis direction. Also, the distance from the lens rear end portion to the image sensing element, i.e., the back focus is prolonged, and it is difficult to obtain a desired optical characteristic. Furthermore, since the parallel glass plates 203 and 208 must be independently arranged in the horizontal and vertical directions, the number of parts and cost increase.

FIG. 4 shows the arrangement of a conventional image sensing apparatus which reduces the number of parallel glass plates to one so as to solve the problem of FIG. 1A.

The image sensing apparatus system shown in FIG. 4 comprises lenses 201, a filter 211, and an image sensing element 202 as in the image sensing apparatus shown in FIG. 1A. Note that FIG. 4 is a schematic view showing horizontal and vertical driving portions of a parallel glass plate of the image sensing apparatus when the optical axis principal plane is viewed from the lens side.

Referring to FIG. 4, reference numeral 231 denotes a parallel glass plate; and 232, a frame for holding the parallel glass plate 231. Reference numerals 233 and 234 denote rotation shafts arranged at the two end portions, in the horizontal direction, of the frame 232. These rotation shafts 233 and 234 support the frame 232 (i.e., the glass plate 231) to be rotatable about an axis A (consequently, in the vertical direction of the image sensing element 202) with respect to a frame 237 (to be described below). Reference numeral 235 denotes a cam pin arranged on the lower end of the frame 232. A portion of the cam pin 235 contacts the cam surface of a cam 236. When the pin 235 moves vertically, the frame 232 is rotated about the axis A. The cam 236 is rotated by a stepping motor 247, and has a substantially spiral shape so that its radius changes in correspondence with the rotation angle. The cam 236 vertically moves the cam pin 235 by its rotation, thereby rotating the frame 237 about the axis A.

FIG. 5 is a view showing the cam 236 when viewed from the front side of the rotation shaft of the stepping motor 247. As shown in FIG. 5, the cam 236 has a plurality of segments. Since these segments have different radii by a predetermined amount, the cam pin 235, which is in a contact with the outer circumferential surface of the cam 236, is displaced in the vertical direction in FIG. 5 upon rotation of the stepping motor 247.

Reference numeral 237 denotes a frame which supports the frame 232 via the rotation shafts 233 and 234 to be rotatable about the axis A. The frame 237 has an opening, and hence, has a substantially rectangular shape. Bearing portions 238 and 239 which rotatably engage with the rotation shafts 233 and 234 are arranged at the two end portions, in the horizontal direction, of the opening. Rotation shafts 241 and 242 (the shaft 242 is not seen since it is located below the cam pin 235 in FIG. 4) are arranged on the two end portions, in the vertical direction, of the outer portion of the frame 237, and the frame 237 is held by bearing portions 243 and 244 (which is located below the cam pin 235 in FIG. 4) arranged on the two end portions, in the vertical direction of a base 250 so as to be rotatable about an axis B in the horizontal direction with respect to the base 250.

Reference numeral 240 denotes a cam pin arranged on one end of the frame 237. A portion of the cam pin 240 contacts the cam surface of a cam 249. When the pin 240 vertically moves in a direction perpendicular to the plane of the drawing of FIG. 4, the frame 237 is rotated about the axis B. The cam 249 is rotated by a stepping motor 248, and has a substantially spiral shape, so that its radius changes in correspondence with the rotation angle. The shape of the cam 249 is substantially the same as that of the cam 236 shown in FIG. 5. When the cam pin 240 is vertically moved upon rotation of the cam 249, the frame 237 is rotated about the axis B.

Reference numeral 245 denotes a coil spring wound around the rotation shaft 241 of the frame 237; and 246, a coil spring wound around the rotation shaft 234 of the frame 232. The springs 245 and 246 normally bias the cam pins 250 and 235 against the cams 249 and 236, respectively. Note that the stepping motors 247 and 248 are fixed to the base 250.

In the above arrangement, when the stepping motors 248 and 247 are driven, the cams 249 and 236 rotate, and the cam pins 240 and 235 which are in a contact with the cams move in the direction perpendicular to the plane of the drawing in FIG. 4, thereby displacing the parallel glass plate 231 by a very small amount in the horizontal and vertical directions. The pixel displacement can be attained by this displacement, and substantially the same effect as that obtained when an image sensing element with a large number of pixels is used can be obtained.

According to the above-mentioned arrangement shown in FIG. 4, since the axis B extending through the rotation shafts 241 and 242 used for rotating the frame 237, and the axis, in the longitudinal direction, of the cam pin 235 for moving the frame 232 vertically in the plane of the drawing of FIG. 4 are located on a single line, the operation for rotating the frame 232 about the axis A, and the operation for rotating the frame 237 about the axis B are completely independent from each other. More specifically, although the frame 237 for supporting the rotation shafts 238 and 239 of the holding frame 232 is not fixed but rotates about the rotation shaft 241, the cam pin 235 for giving a rotation moment to the frame 232 matches the axis B, and the rotation of the frame 237 will not influence the frame 232.

However, according to the prior art shown in FIG. 4, since a driving portion for rotating the frame 237 about the axis B (i.e., a horizontal pixel displacement driving portion) and a driving portion for rotating the frame 232 about the axis A (i.e., a vertical pixel displacement driving portion) are arranged in orthogonal directions, driving motors cannot be appropriately arranged, and hence, the thickness of a lens unit portion must be increased. As a result, the entire apparatus becomes large in size.

SUMMARY OF THE INVENTION

It is an object of the present invention to provide an image sensing apparatus which can solve the above-mentioned problems, and has a compact, simple arrangement.

It is another object of the present invention to provide an image sensing apparatus which can attain a compact structure since two mechanisms or two means for displacing or rotating a deflector in two directions are concentrated on one side for one rotation axis of the deflector.

It is still another object of the present invention to provide an image sensing apparatus which has two cams as cam means, and drives the cams using a single driving source (e.g., a motor), thereby achieving a compact structure.

It is still another object of the present invention to provide an image sensing apparatus which has a single cam as cam means, and forms two cam surfaces on the cam, thereby achieving a compact apparatus.

It is still another object of the present invention to provide an image sensing apparatus, in which two cam surfaces are formed to compensate for an interference that influences deflector rotation about one axis upon deflector rotation about the other axis, thereby achieving a compact apparatus.

It is still another object of the present invention to provide an image sensing apparatus, in which, the cam lift amount of the other cam is deformed or modified to match the cam lift change amount which would be generated when a deflector is rotated about one axis using one cam, thereby achieving a compact apparatus.

It is still another object of the present invention to provide an image sensing apparatus which further comprises low-pass filter means which is supported to be rotatable about the optical axis, thereby varying the cut-off frequency.

It is still another object of the present invention to provide an image sensing apparatus, in which when rotations, about two axes, of a deflector are attained using cam means, two cam surface profiles are provided to the cam means, and these cam surface profiles are formed to cancel the rotation interference of the deflector, thereby achieving a compact apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 11A, 11B, and 11C are views for explaining the operation principle of the low-pass filter;

FIG. 15 is a schematic view showing the image fetching positions on an image sensing element of the first embodiment;

FIG. 20 is a view showing the pixel displacement order in the second embodiment;

FIG. 29 is a graph showing the operation timings of the X- and Y-direction cams 50 and 40 of the third embodiment;

FIG. 30 is a view for explaining the pixel displacement order of the third embodiment;

DETAILED DESCRIPTION OF THE EMBODIMENTS

The preferred embodiments of the present invention will be described hereinafter with reference to the accompanying drawings.

<First Embodiment>

Figure 1A:
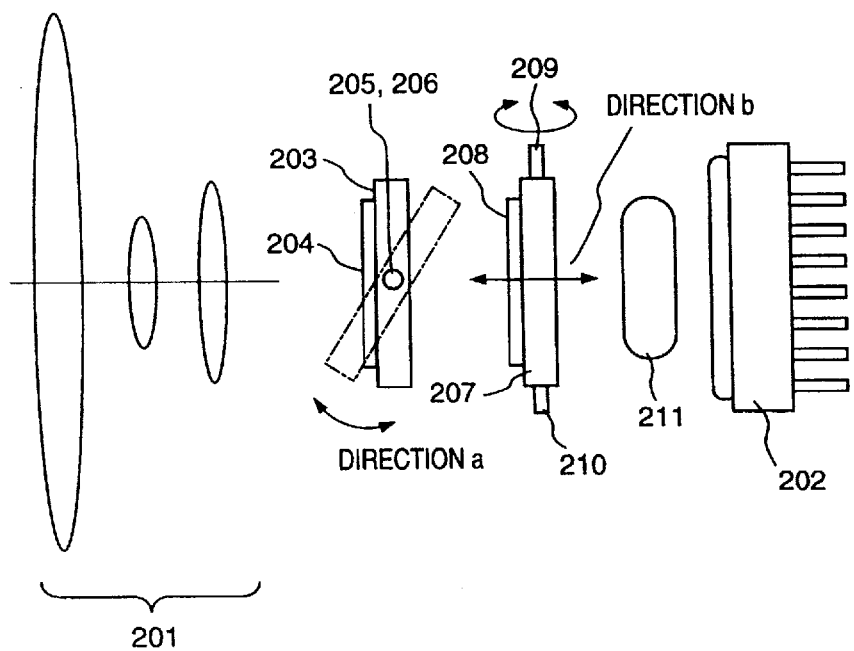
FIG. 1A is a block diagram of a conventional deflector driving apparatus.
Figure 1B:
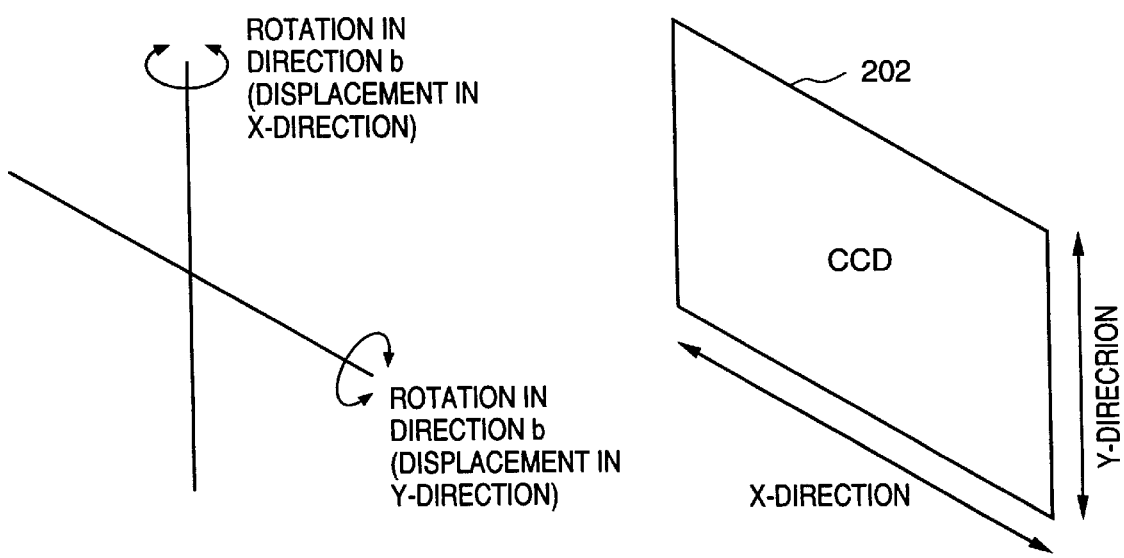
FIG. 1B is a view for explaining the principle of pixel displacement in the driving apparatus shown in FIG. 1A.
Figure 2A:
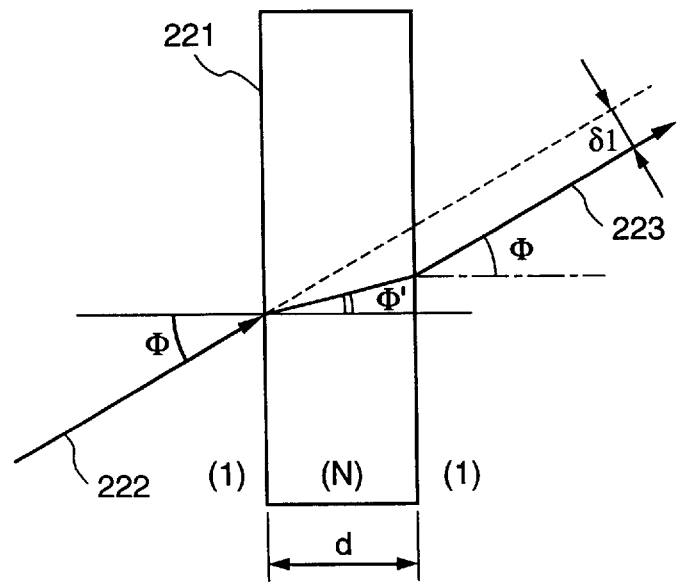
FIGS. 2A and 2B are views for explaining the principle of optical path displacement using deflectors.
Figure 2B:
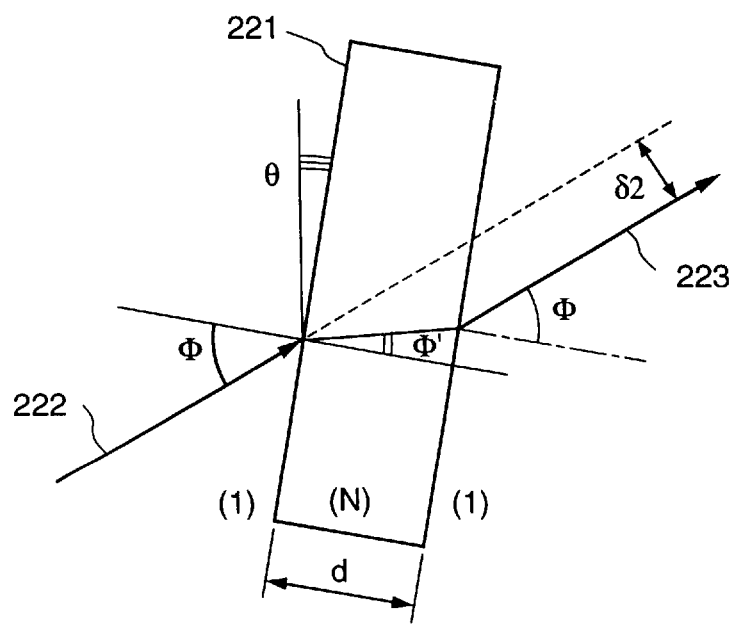
Figure 3A:
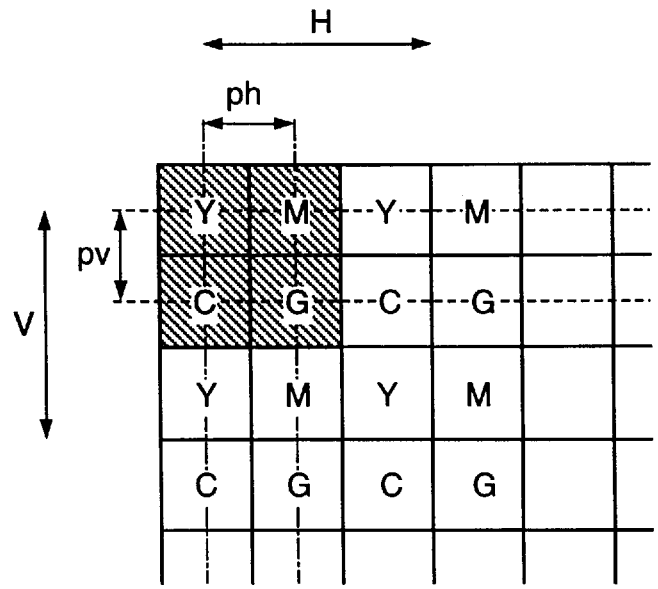
FIG. 3A is a view showing an example of the pixel arrangement and aperture of an image sensing element.
Figure 3B:
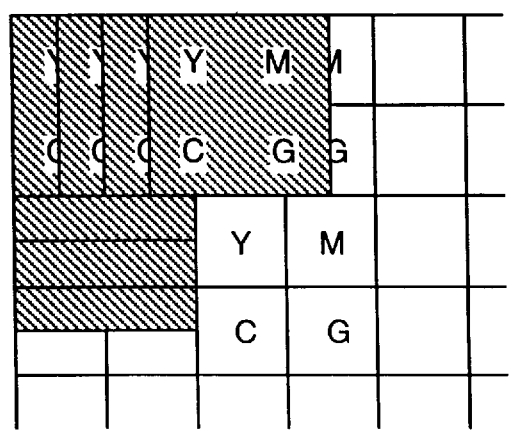
FIG. 3B is a view for explaining the principle of obtaining a plurality of pieces of image information by pixel displacement.
Figure 4:
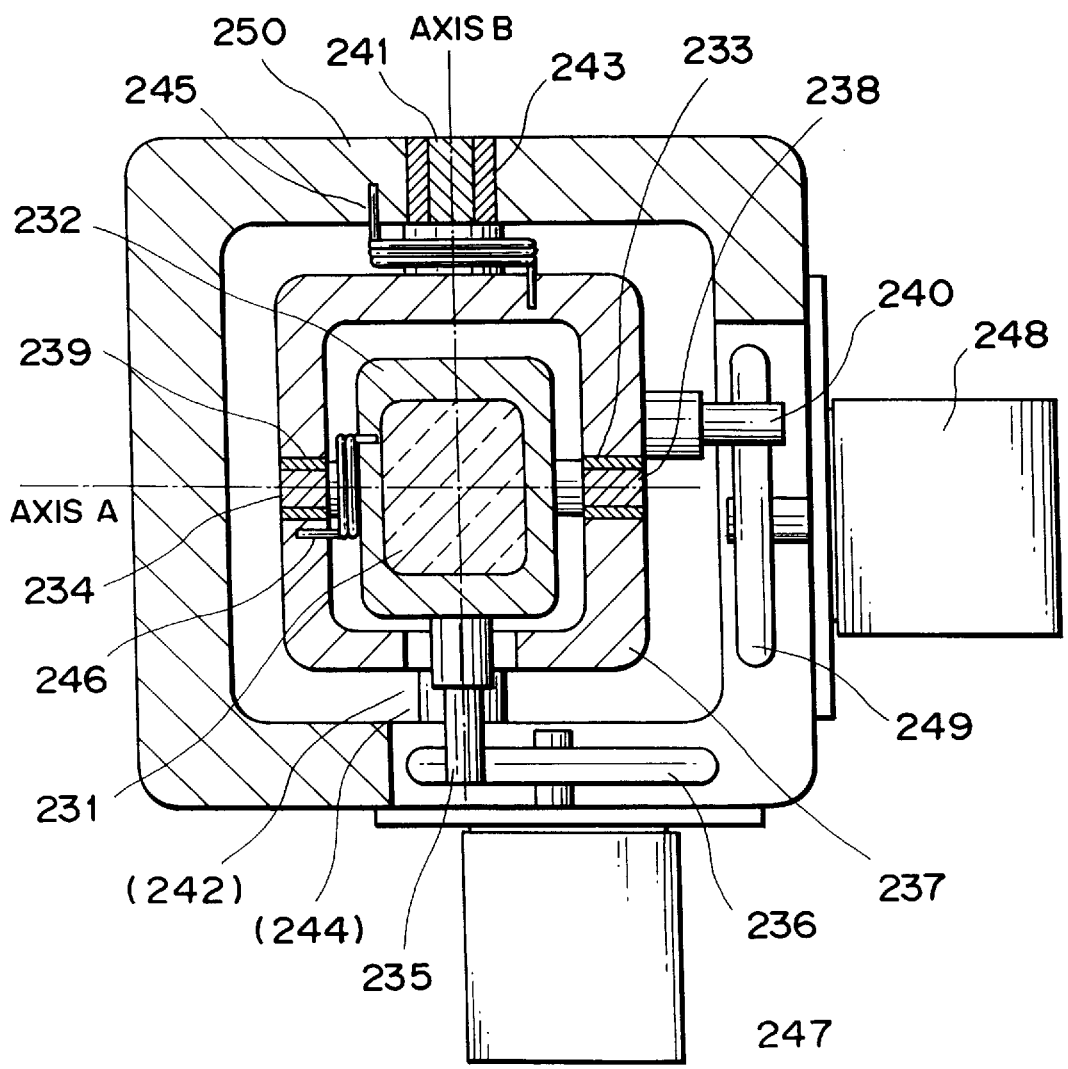
FIG. 4 is a block diagram of a conventional deflector driving apparatus which is obtained by improving the prior art shown in FIG. 1A.
Figure 5:
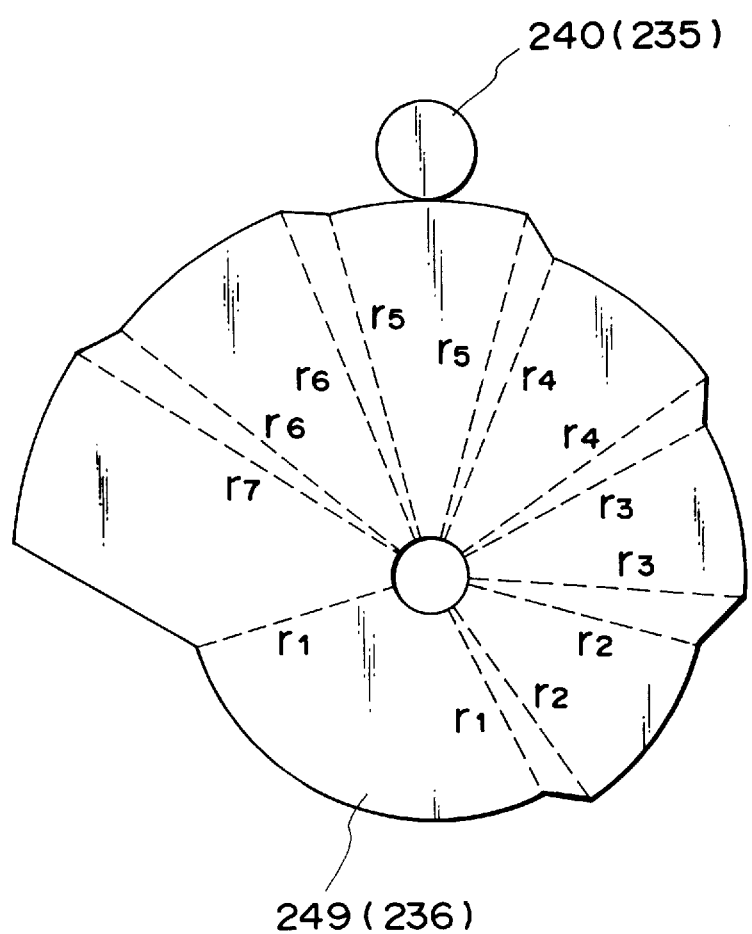
FIG. 5 is a side view showing principal part of an X-direction driving cam (Y-direction driving cam) used in the apparatus shown in FIG. 4.
Figure 6:
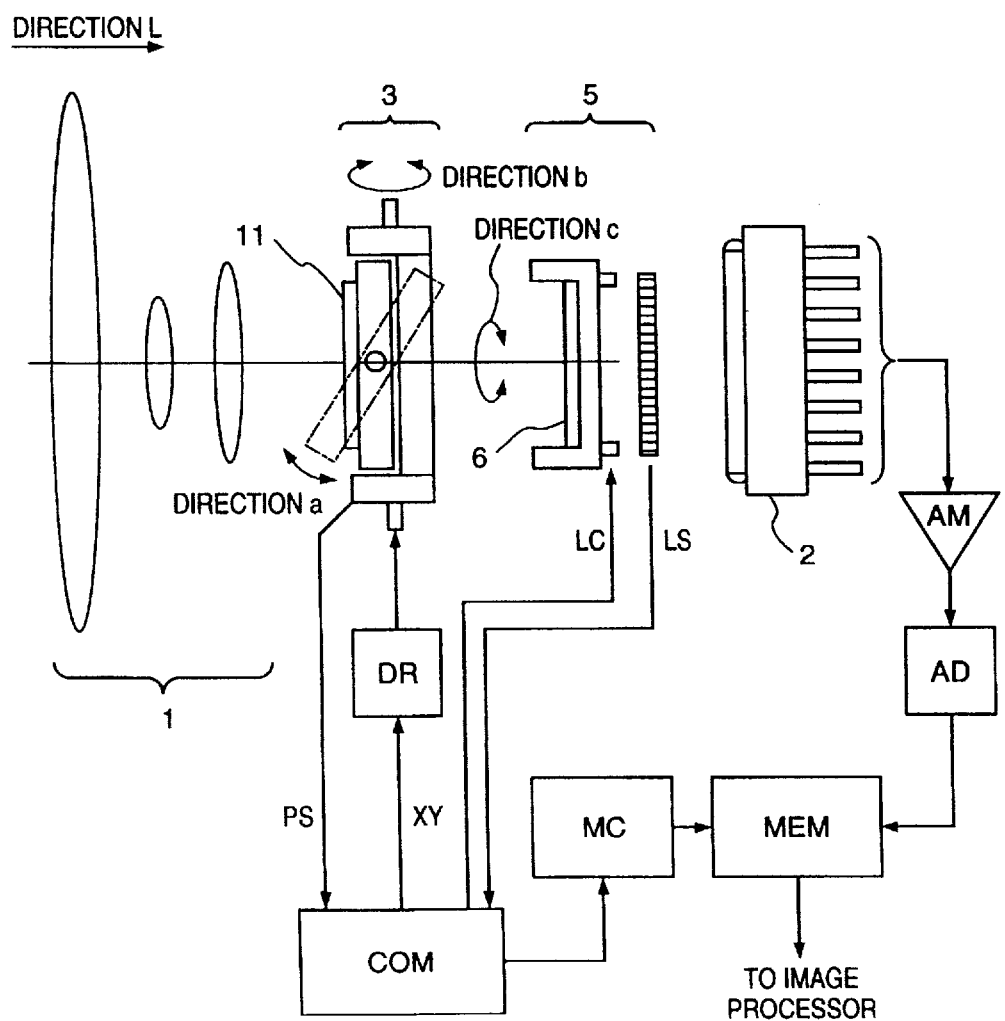
FIG. 6 is a schematic block diagram of an image sensing apparatus according to the first and second embodiments of the present invention.

FIG. 6 is a schematic block diagram showing the arrangement of an image sensing apparatus of the first embodiment.

Referring to FIG. 6, reference numerals 1 denotes lenses; and 2, an image sensing element such as a CCD, which photoelectrically converts an optical image of an object formed by the lenses 1, and outputs an image sensing signal. Reference numeral 11 denotes a parallel glass plate, which is held by a predetermined frame. The frame is rotated in directions a and b in FIG. 6 by a driving portion 3. As will be described later, the parallel glass plate has a function of changing the optical axis in this embodiment, but may be replaced by, e.g., a grating lattice as long as it can change the optical path. Therefore, the parallel glass plate will be referred to as a "deflector" hereinafter.

The driving portion 3 is arranged on the optical axis between the lenses 1 and the image sensing element 2. When the holding frame is rotated in the directions a and b in FIG. 6, an optical image input to the image sensing element 2 shifts in the vertical and horizontal directions on the image sensing plate of the image sensing element, thus attaining pixel displacement. Reference numeral 5 denotes a mechanism portion for rotating an optical low-pass filter 6. The optical low-pass filter 6 is held at the central portion of the mechanism portion 5 to be rotatable about the optical axis (in a direction c in FIG. 6) within a predetermined angle range.

Also, referring to FIG. 6, reference symbol AM denotes a pre-amplifier for amplifying the image sensing signal output from the image sensing element 2 to a predetermined level; AD, an A/D converter for converting the image sensing signal output from the pre-amplifier into a digital signal; MEM, an image memory for storing the digital image sensing signal converted by the converter AD; MC, a memory controller for controlling read/write timings by generating read/write addresses of the image memory MEM in accordance with a command from a system controller COM (to be described later); DR, a driving circuit for driving a stepping motor in the horizontal (X) and vertical (Y) directions in the deflector driving portion 3; and COM, a system controller for controlling the operation of the entire system. The controller COM comprises, e.g., a microcomputer.

In FIG. 6, a signal XY is a driving control signal which is supplied to the driving portion 3 to rotate the deflector 11 in the horizontal (X) and vertical (Y) directions. In the first embodiment, since the deflector 11 is rotated in both the X- and Y-directions by a single motor, the driving control signal will be referred to as a signal "XY" hereinafter.

A signal PS supplied from the deflector driving portion 3 to the system controller COM indicates an initial position signal which is output from a sensor (a sensor 30S to be described later) for detecting the phase of a cam (a cam 27 to be described later) for actually driving the deflector 11. More specifically, the system controller COM controls the deflector driving portion 3 via the driving circuit DR to rotate the deflector 11. At this time, the controller COM accurately controls the timings in the horizontal (X) and vertical (Y) directions while detecting the rotation phase of the deflector using the signal PS. The controller COM sequentially shifts the incident position of incident light on the image sensing element 2, as shown in FIG. 15, by rotating the deflector 11 in the X- and Y-directions, and controls the memory controller MC to store each pixel information sensed at each position in the image memory MEM. With this operation, a plurality of pieces of image information at the respective driving positions of the deflector driving portion 3 are synthesized on the image memory MEM, thereby outputting high-quality image information obtained by substantially increasing the number of pixels.

The system controller COM controls the optical low-pass filter rotation mechanism portion 5 using a control signal LC. More specifically, the controller COM controls the rotation mechanism portion 5 upon reception of a detection output (initial position signal) LS of an initial position sensor 48 (shown in detail in FIG. 10) arranged in the rotation mechanism portion 5.

The deflector driving portion 3 of the first embodiment will be described below with reference to FIG. 7 and FIGS. 8A and 8B.

Figure 7:
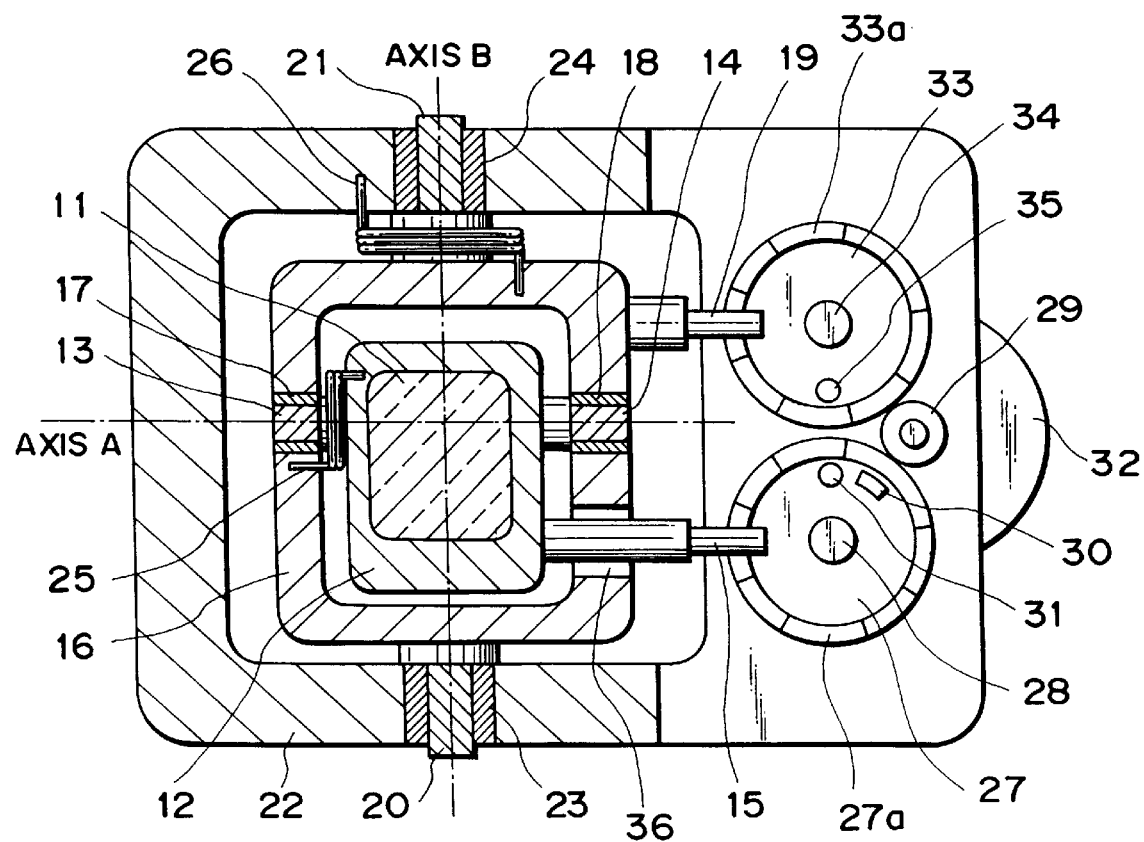
FIG. 7 is a schematic view showing a deflector driving portion according to the first embodiment of the present invention.

FIG. 7 is a view of the deflector driving portion 3 when viewed from the optical axis principal plane direction (a direction L in FIG. 6) on the lens side. In FIG. 7, the deflector 11 deflects incident light transmitted through the lenses 1 when it is rotated, thereby changing the optical path leading to the image sensing element 2. Reference numeral 12 denotes a holding frame for holding the deflector 11; 13 and 14, rotation shaft portions which are arranged at the two end portions, in the horizontal direction, of the holding frame 12, and support the holding frame 12 to be rotatable about an axis A in the vertical direction with respect to a holding frame 16 (to be described later); and 15, a cam pin which is formed on a portion of the holding frame 12 and engages with a cam 27 (to be described later) to rotate the frame 12.

Reference numeral 16 denotes a hollow holding frame which is formed to surround the holding frame 12; 17 and 18, bearing portions which are arranged at the two end portions, in the horizontal direction, of the inner hollow portion of the holding frame 16, and engage with the rotation shaft portions 13 and 14 to hold the holding frame 12 rotatably about the axis A; 19, a cam pin which is arranged on a portion of the holding frame 16, and engages with a cam 33 (to be described later) to rotate the frame 16 about an axis B; 20 and 21, rotation shaft portions which are arranged at the two end portions, in the vertical direction, of the outer portion of the holding frame 16; 22, a base which is a portion of a lens barrel and supports the deflector driving portion 3; 23 and 24, bearing portions which are arranged at the two end portions, in the vertical direction, of the base 22, and engage with the rotation shaft portions 20 and 21 of the holding frame 16 to hold the holding frame 16 rotatably about the axis B; 25, a coil spring which is wound around the rotation shaft portion 13 and biases the holding frame 12 in one direction (in a direction to press the cam pin 15 against the cam surface of the cam 27); and 26, a coil spring which is wound around the rotation shaft portion 21 and biases the holding frame 16 in one direction (in a direction to press the cam pin 19 against the cam surface of the cam 32).

Reference numeral 27 denotes a cam for driving the holding frame 12. The cam 27 is rotatably supported on a shaft portion 28 formed on the base 22. A gear portion 27b (see FIG. 8B) is formed on the outer circumferential portion of the cam 27, and engages with a pinion 29 which is press-fitted onto the output shaft of a stepping motor 32 as a driving source so as to transmit rotation.

Furthermore, a face cam surface 27a is formed on one surface, in the thrust direction, of the peripheral edge portion of the cam 27. The cam surface 27a contacts the cam pin 15 of the holding frame 12 to rotate the holding frame 12. The cam pin 15 is biased by the coil spring 25 to contact the face cam surface 27a. Therefore, when the stepping motor 32 is driven to rotate the cam 27, the face cam surface 27a vertically moves the cam pin 15 and rotates the holding frame 12 about the axis A so as to shift the incident position of incident light onto the image sensing element in the vertical direction, i.e., the Y-direction (the vertical direction of the image sensing surface of the image sensing element), thereby attaining pixel displacement in the vertical direction. In this specification, the cam 27 will be referred to as a "Y-direction cam 27" hereinafter.

Reference numeral 30 denotes a projection which stands upright on a portion, in the thrust direction, of the Y-direction cam 27. A sensor 30S (see FIG. 8B) such as a photo interrupter detects the initial position upon rotation of the Y-direction cam 27 by detecting this projection 30. Reference numeral 31 denotes a reference hole formed on the surface, in the thrust direction, of the Y-direction cam 27. The hole 31 is used for phase adjustment with the cam 33.

Reference numeral 33 denotes a cam for driving the holding frame 16. The cam 33 rotatably engages with a shaft portion 34 formed on the base 22. A gear portion 33b (see FIG. 8A) is formed on the outer circumferential portion of the cam 33, and engages with the pinion 29 which is press-fitted onto the output shaft of the stepping motor 32 as a driving source so as to transmit rotation. A face cam surface 33a is formed on one surface, in the thrust direction, of the peripheral edge portion of the cam 33. The cam surface 33 contacts the cam pin 19 of the holding frame 16 to rotate the holding frame 16 about the axis B. The cam pin 19 normally contacts the face cam surface 33a by the coil spring 26. Therefore, when the stepping motor 32 is driven to rotate the cam 33, the face cam surface 33a vertically moves the cam pin 19 and rotates the holding frame 16 about the axis B, thereby shifting the incident position of incident light onto the image sensing element in the horizontal direction (X-direction). Thus, the cam 33 will be referred to as an "X-direction cam" hereinafter.

Reference numeral 35 denotes a reference hole formed on the thrust surface side of the X-direction cam 33. When it is detected that the reference hole 31 of the Y-direction cam 27 reaches a predetermined position, the reference hole 35 of the X-direction cam 33 should also reach a predetermined position. Thus, the phase adjustment between the X- and Y-direction cams 33 and 27 can be confirmed using the reference holes 31 and 35.

Figure 8A:
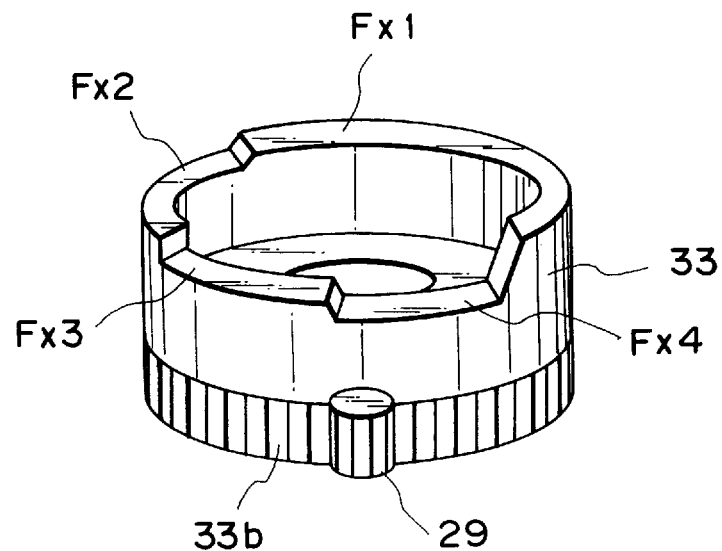
FIG. 8A is a perspective view showing the outer appearance of an X-direction cam 33 used in the first embodiment.

FIG. 8A is a perspective view showing the outer appearance of the X-direction cam 33. The first embodiment uses a cam obtained by molding a fluorine-containing PPS resin to improve the slidability of the face cam surface 33a. Alternatively, the cam may consist of brass, an iron alloy, or the like, and a lubricant may be coated on the sliding surface.

Figure 9A:
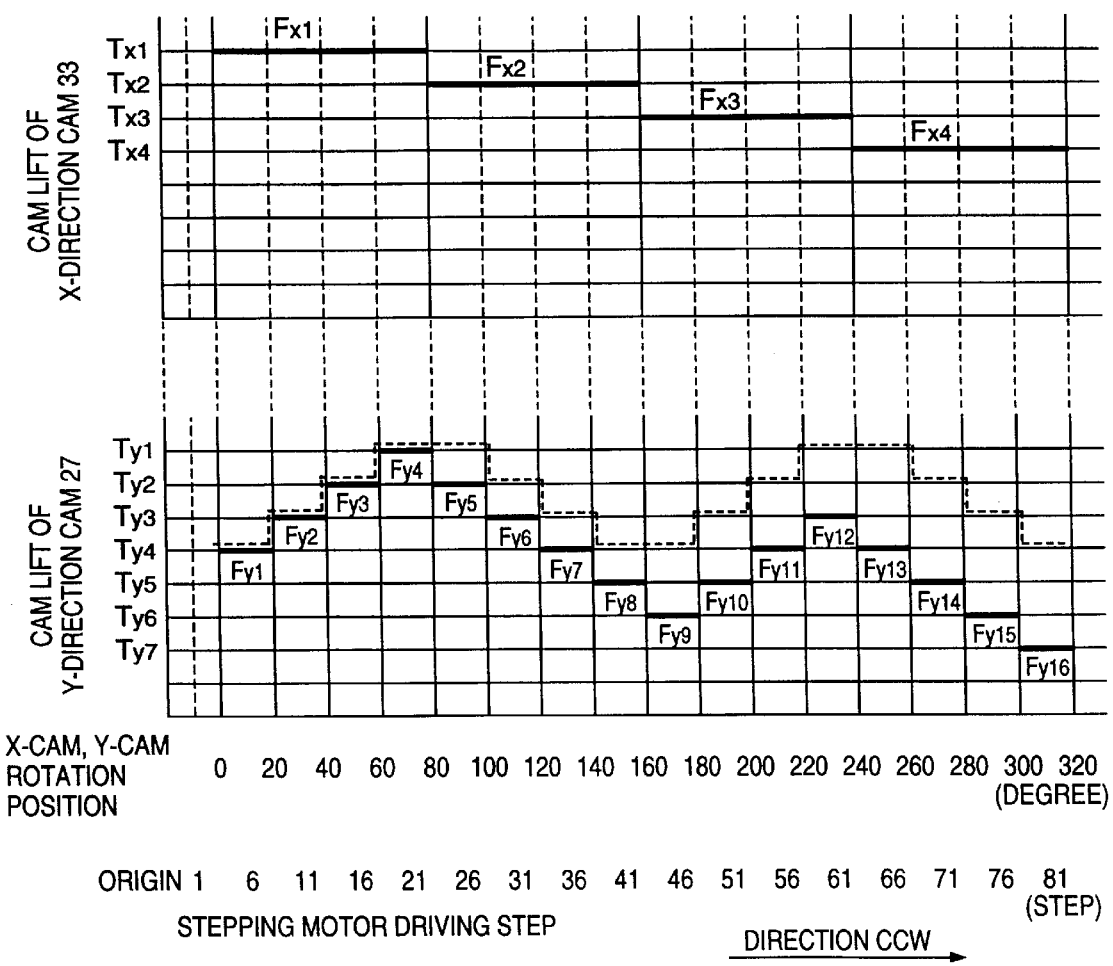
FIG. 9A is a graph showing the relationship between the rotation position and the cam lift of the X- and Y-direction cams 33 and 27 of the first embodiment.

As shown in FIG. 8A, four different cam surfaces $Fx_1$ to $Fx_4$ are formed on the X-direction cam 33, and constitute resting cam surfaces having cam surface heights $Tx_1$, $Tx_2$, $Tx_3$, and $Tx_4$ (FIG. 9A). Therefore, in the region of each face surface ($Fx_1$, $Fx_2$, ..., $Fx_4$), the height remains the same, and a change in cam lift can be absorbed even when the attachment phase of the stepping motor 32 deviates.

Figure 8B:
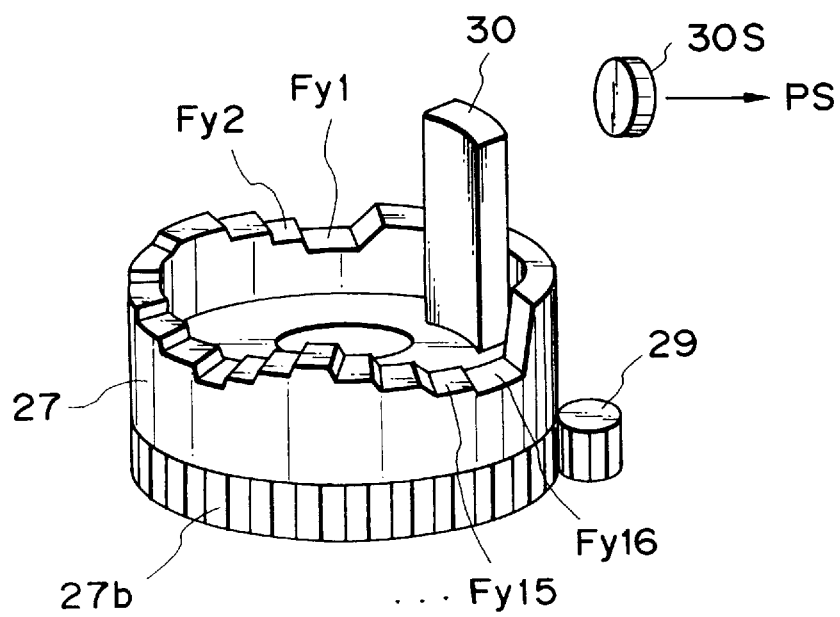
FIG. 8B is a perspective view showing the outer appearance of a Y-direction cam 27 used in the first embodiment.

FIG. 8B is a perspective view showing the outer appearance of the Y-direction cam 27. In this embodiment, a cam obtained by molding a fluorine-containing PPS resin to improve the slidability of the face cam surface is used as in the X-direction cam 33. The cam profile of the Y-direction cam 27 has 16 cam surfaces ($Fy_1$, $Fy_2$, ..., $Fy_{16}$) unlike the X-direction cam 33, and these faces constitute resting cam surfaces (a cam which is displaced stepwise) consisting of seven different cam lifts ($Ty_1$, $Ty_2$, . . . , $Ty_7$ in FIG. 9A). Therefore, in the region of each face surface ($Fy_1$, $Fy_2$, . . . , $Fy_{16}$), the height remains the same, and a change in cam lift can be absorbed even when the attachment phase of the stepping motor 32 deviates.

As described above, the X- and Y-direction cams 33 and 27 require an initialization operation. The operation will be described later. FIG. 9A shows the relationship between the face surfaces and the cam rotation position (angle) of the initialized X- and Y-direction cams 33 and 27, and the number of driving steps of the stepping motor. Since the first embodiment adopts the arrangement in which both the X- and Y-direction cams 33 and 27 are coupled to the single stepping motor 32, the attachment phases of the X- and Y-direction cams 33 and 27 are important. As will be described later with reference to the flow chart, when the reference holes 35 and 31 formed on the X- and Y-direction cams 33 and 27 are adjusted upon assembling of this image sensing apparatus, the phases of the two cams are locked. The attachment phases of the X- and Y-direction cams 33 and 37 are as shown in the graph of FIG. 9A.

In FIG. 9A, the abscissa indicates the face surface position of the X-direction cam 33 (or the Y-direction cam 27), in other words, the rotation position of the cam. The rotation position is expressed by an angle θ (degree) in the counter-clockwise direction from one end position of the first cam surface (the cam surfaces $Fx_1$ and $Fy_1$ of the X- and Y-direction cams 33 and 27), and the cam function is obtained within the angle range of 0° to 320°. The cam rotation position defined by the number of steps of the stepping motor 32 is expressed by the number of driving steps of the stepping motor 32 from the initial position to the central position of each face surface, and falls within the range of step 1 to step 81.

The ordinate in FIG. 9A indicates the cam lift (cam surface height) at the position where the cam pin 19 (or the cam pin 15) contacts. As can be seen from FIG. 9A, the face surfaces of the X-direction cam 33 are formed in units of 80°, and each time the cam 33 rotates through 80°, the cam lift amount changes by one step ($Tx_1 \rightarrow Tx_2 \rightarrow Tx_3 \rightarrow Tx_4$). On the other hand, the face surfaces of the Y-direction cam 27 are formed in units of 20°, and each time the cam 27 rotates through 20°, the cam lift amount changes by one step ($Ty_4 \rightarrow Ty_3 \rightarrow Ty_2 \rightarrow Ty_1 \rightarrow Ty_2 \rightarrow Ty_3 \rightarrow Ty_4 \rightarrow Ty_5 \rightarrow Ty_6 \rightarrow Ty_5 \rightarrow Ty_4 \rightarrow Ty_3 \rightarrow Ty_4 \rightarrow Ty_5 \rightarrow Ty_6 \rightarrow Ty_7$). In the first embodiment, when the X-direction cam 33 rotates and the cam lift changes by one step, a pixel displacement for a 0.5 pixel in the X-direction is attained; when the Y-direction cam 27 rotates and the cam lift changes by one step, a pixel displacement for a 0.5 pixel in the Y-direction is attained. In the first embodiment, one step of the stepping motor 32 corresponds to a cam rotation angle of 4°.

The optical low-pass filter rotation mechanism portion 5 will be described below with reference to FIG. 10 and FIGS. 11A to 11C.

Figure 10:
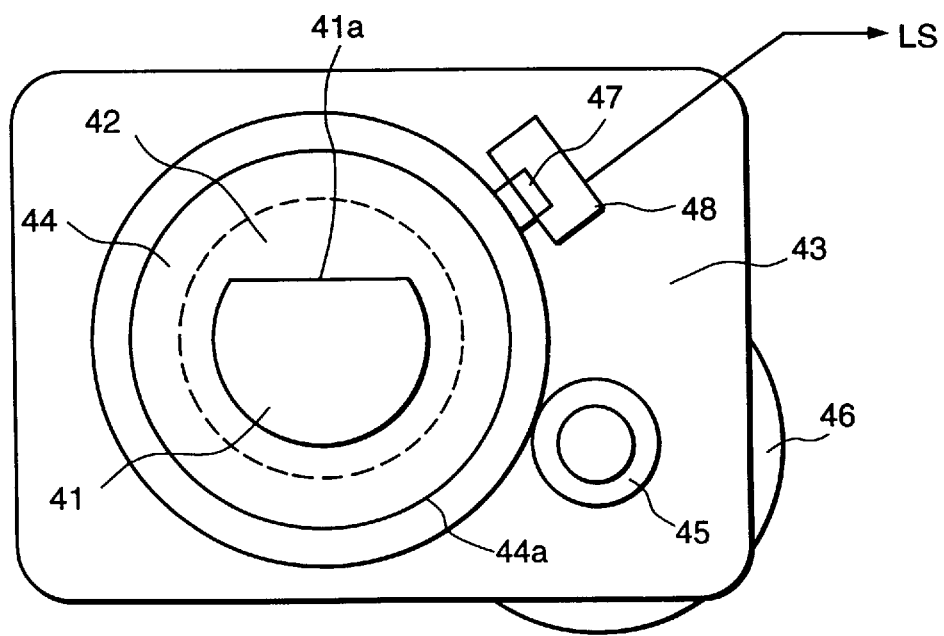
FIG. 10 is a schematic view of a rotation mechanism portion 5 of an optical low-pass filter of the first to third embodiments.

FIG. 10 shows the optical low-pass filter rotation mechanism portion when viewed from the optical axis principal plane on the lens side (from the direction L in FIG. 6). The mechanism portion 5 has a quartz plate 41 which rotates about the optical axis, and a quartz plate 42 which is fixed and is not rotatable. As shown in FIG. 10, the quartz plate 41 has a shape obtained by notching (41a) one surface of its upper portion. The quartz plate 41 separates extraordinary light rays at an angle of 135° viewed from the direction L from incident light, as shown in FIG. 11A, when the notched surface 41a is parallel to the horizontal plane and faces up.

The fixed quartz plate 42 which is arranged on the rear side of the movable quartz plate 41 is fixed to a base 43, and the separation direction of ordinary light rays (the direction of extraordinary light rays) by the quartz plate 42 is always 0° (horizontal) viewed from the direction L, as shown in FIG. 11B.

Reference numeral 44 denotes an LPF holder. The quartz plate 41 is fixed to substantially the central portion of the LPF holder 44, and a gear portion 44a is formed on the outer circumferential surface of the holder 44. The holder 44 is rotatably held by the base 43. A collar-shaped projection 47 is formed on a portion of the outer circumferential surface of the holder 44.

Reference numeral 45 denotes a pinion which rotatably engages with the gear portion 44a. The pinion 45 is press-fitted onto the output shaft of a stepping motor 46 as a driving source. Therefore, upon rotation of the stepping motor 46, the holder 44 is rotated. Reference numeral 48 denotes an initialization sensor, which detects the rotation initial position of the holder 44 (i.e., of the quartz plate 41) by detecting the above-mentioned projection 47.

In the above arrangement, when the quartz plate 41 is located at the position shown in FIG. 11B, the two quartz plates 41 and 42 serve as a filter having a high cut-off frequency for the spatial frequency with respect to light incident on this low-pass filter (i.e., the quartz plate 41). More specifically, the low-pass filter passes horizontal and vertical components having a relatively high spatial frequency of the incident light. On the other hand, when the movable quartz plate 41 rotates counterclockwise (in a direction M shown in FIG. 11A) through 45° from the position shown in FIG. 11B, and moves to the position shown in FIG. 11C, the vertical components of the incident light are canceled, and the cut-off frequency band is widened, so that only components of a relatively low frequency pass through this filter rotation mechanism portion 5. More specifically, the quartz plates 41 and 42 serve as a low-pass filter when the quartz plate 41 is located at the position shown in FIG. 11C.

Figure 12:
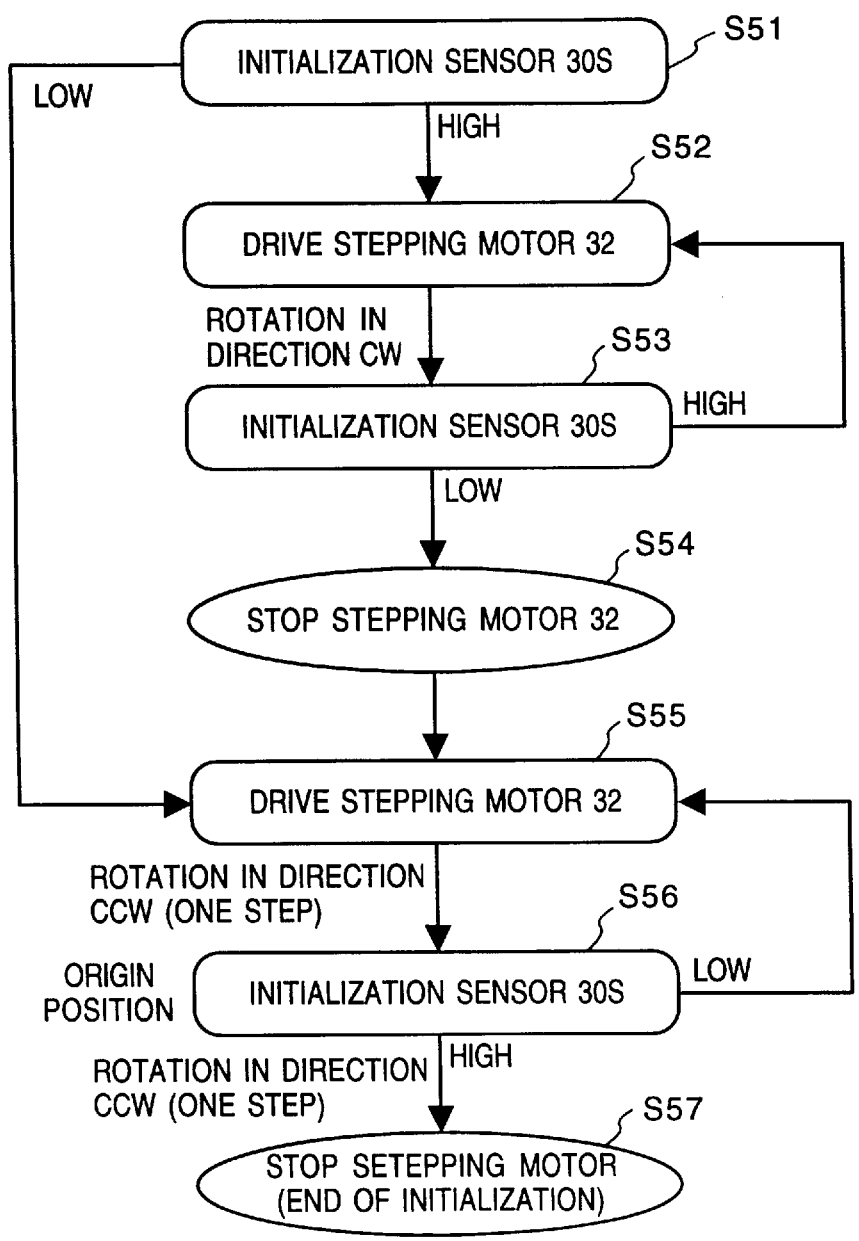
FIG. 12 is a flow chart showing the control sequence for initializing the X- and Y-direction cams 33 and 27 (i.e., initializing a motor 32) in the first embodiment.
Figure 13A:
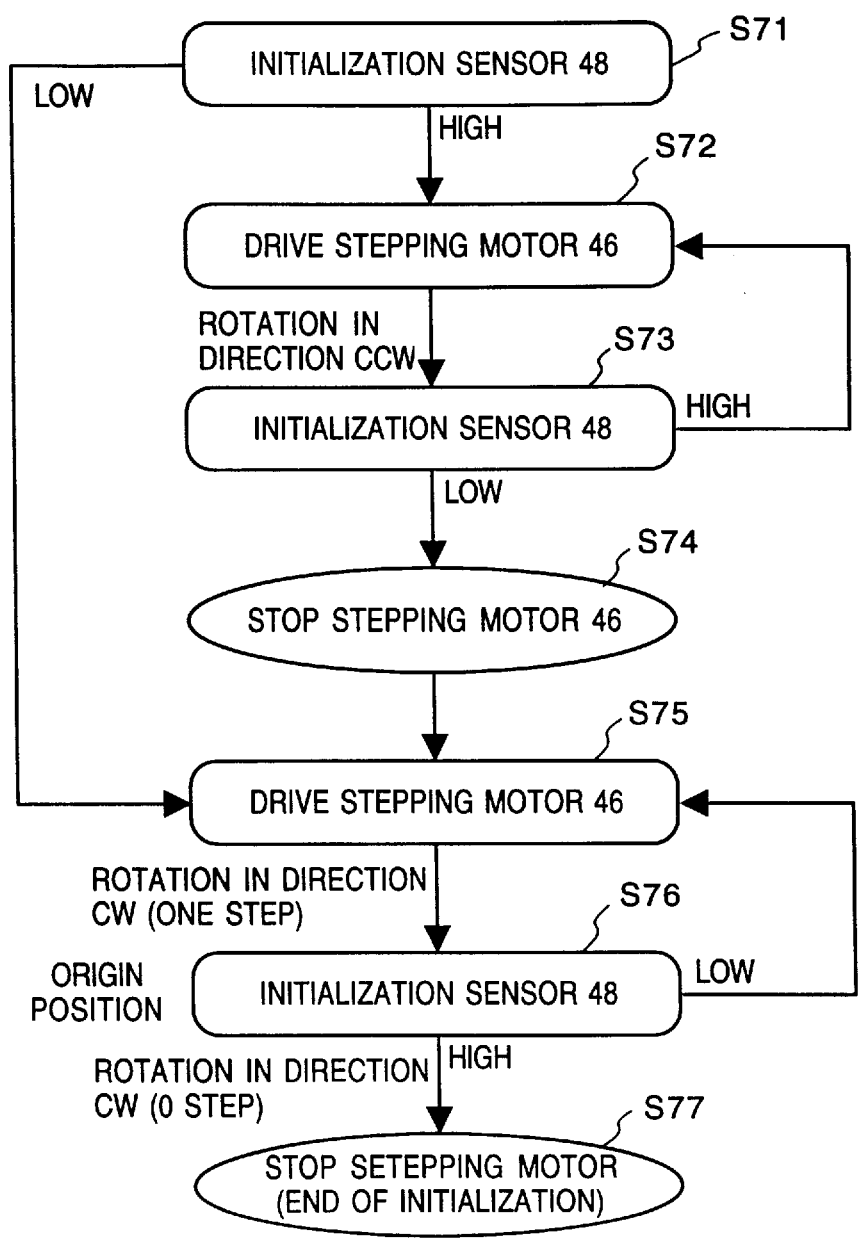
FIG. 13A is a flow chart showing the control sequence for initializing the optical low-pass filter in the first embodiment.

The initialization operation in the image sensing apparatus of this embodiment will be described below. FIG. 12 is a flow chart showing the initialization operation sequence of the deflector driving portion 3, and FIG. 13A is a flow chart showing the initialization operation sequence of the filter rotation mechanism portion 5. When the power supply of this image sensing apparatus is turned on, the system controller COM executes the control sequences shown in FIGS. 12 and 13A.

As can be seen from FIG. 8B, the initial position of the Y-direction cam 27 is defined as a position where the output from the sensor 30S changes from LOW level to HIGH level. Thus, when the power supply voltage is supplied to the deflector driving portion 3, it is checked in step S51 if the output from the initialization sensor 30S is at HIGH or LOW level. If the output from the sensor 30S is already at LOW level, i.e., if the sensor 30S does not detect the projection 30 (FIG. 8B), the flow advances to step S55 to rotate the motor 32 in a direction CCW until the output from the sensor 30S changes to HIGH level (until the sensor 30S detects the projection 30). When the sensor output changes to HIGH level, the system controller COM recognizes the position as an initial position. When the motor 32 is further rotated by one step in the direction CCW and is stopped, the deflector 11 becomes parallel to the optical axis principal plane.

Note that the clockwise rotation direction of the stepping motor 32 when viewed from its output shaft is defined as CW, and its counterclockwise rotation direction is defined as CCW in this specification.

If it is determined in step S51 that the output from the sensor 30S is at HIGH level, since the Y-direction cam 27 may be excessively rotated (the motor 32 may be excessively rotated in the direction CCW), the motor 32 is rotated in the direction CW until the output from the sensor 30S changes to LOW level in step S52→step S53. When the output from the sensor 30S changes to LOW level, the flow advances to step S54 to stop the motor 32. Then, the flow advances to step S55. In step S55→step S56, the motor 32 is rotated in the direction CCW until the output from the sensor 30S changes to HIGH level (until the sensor 30S detects the projection 30). When the sensor output changes to HIGH level, the motor 32 is further rotated by one step in the direction CCW, and is stopped. This position is defined as the initial position of the motor 32, i.e., the initial position of the Y-direction cam 27. The initialization operation of the motor 32 (i.e., the initialization operation of the Y-direction cam 27) has been described.

As described above, the X-direction cam 33 has been subjected to phase adjustment using the reference holes 31 and 35 in the manufacturing process of this image sensing apparatus. Therefore, upon completion of the control sequence shown in FIG. 12, a correlation between the number of driving steps of the stepping motor 32 and the phases of the cams (Y- and X-direction cams 27 and 33) is established, thus attaining the initialization of the stepping motor 32.

In step S57, the step of checking if the initialization operation is normally performed by checking if the reference holes 31 and 35 are located at predetermined positions may be added to the flow chart shown in FIG. 12.

As described above, in the image sensing apparatus of the first embodiment, since the cam pins 15 and 19 having orthogonal axes A and B are arranged on one side of the image sensing apparatus (in FIG. 7, on the right side of the base 22), the X- and Y-direction cams 33 and 27 can be arranged on the same side, thus assuring a sufficient design margin of other constituting elements used in the image sensing apparatus, and achieving a compact structure of the image sensing apparatus as a whole.

Furthermore, according to the image sensing apparatus of the first embodiment, since the X- and Y-direction cams 33 and 37 are arranged on the same side, a common motor can be used for driving these cams, and the apparatus can be made further compact.

The initialization operation of the filter rotation mechanism portion 5 will be explained below with reference to FIG. 13A. Note that the initial state of the rotation mechanism portion 5 means a state wherein the quartz plates 41 and 42 do not serve as a low-pass filter, i.e., the quartz plate 41 is located at the position shown in FIG. 11A.

As in the initialization of the X- and Y-direction cams 33 and 27 (FIG. 12), when the power supply is turned on, it is checked in step S71 if the output LS from the initialization sensor 48 is at HIGH or LOW level. If the output LS is at LOW level (the initialization sensor 48 detects the projection 47), the flow advances to step S75, and the stepping motor 46 is rotated in the direction CW until the sensor output LS changes to HIGH level in step S75→step S76→step S75. If it is detected that the sensor output LS changes to HIGH level, the stepping motor 46 is rotated by one step in the direction CW, and the system controller COM recognizes this position as an origin position. This state corresponds to the state shown in FIG. 11A, and the cut-off frequency of the quartz plates 41 and 42 is relatively high in this state.

In steps S72, S73, and S74, an operation for initializing the mechanism portion 5 when the motor 46 is excessively rotated is performed. More specifically, if it is determined in step S71 that the sensor output LS is at HIGH level, the flow advances to step S72, and the motor 46 is rotated in the direction CCW until the sensor output LS changes to LOW level in step S72→step S73. If the sensor LS changes to LOW level, the above-mentioned sequence is executed in steps S75 and S76.

Figure 13B:
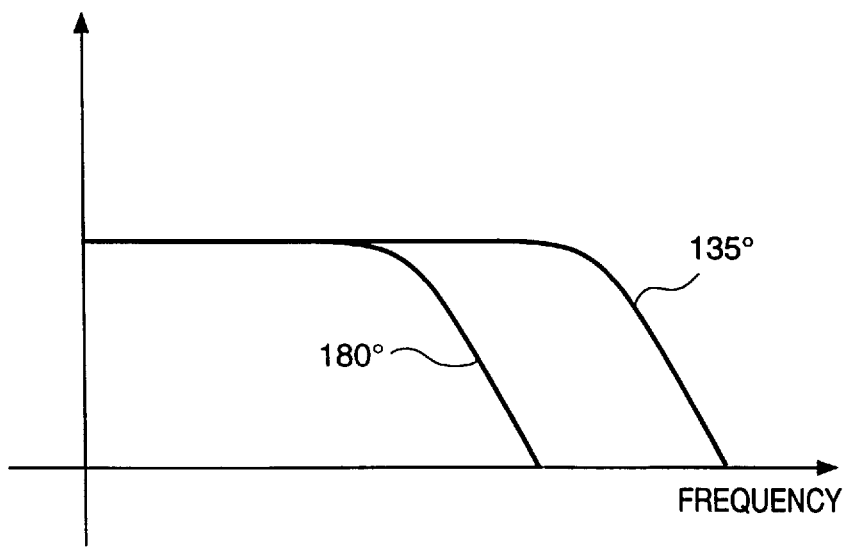
FIG. 13B is a graph for explaining the principle of the switching operation of the low-pass filter between a high image-quality mode and a normal mode.

Upon completion of the above-mentioned initialization operation, a correlation between the number of driving pulses of the stepping motor 46 and the rotation phase of the movable quartz plate 41 is established, and the cut-off frequency band can be arbitrarily changed by controlling the number of steps of the stepping motor 46. More specifically, as shown in FIG. 13B of the first embodiment, when the quartz plate 41 is located at the position of 135° (FIG. 11A), the quartz plates serve as a wide-band low-pass filter; when the quartz plate 41 is located at the position of 180° (FIG. 11C), the quartz plates serve as a narrow-band low-pass filter.

Figure 14:
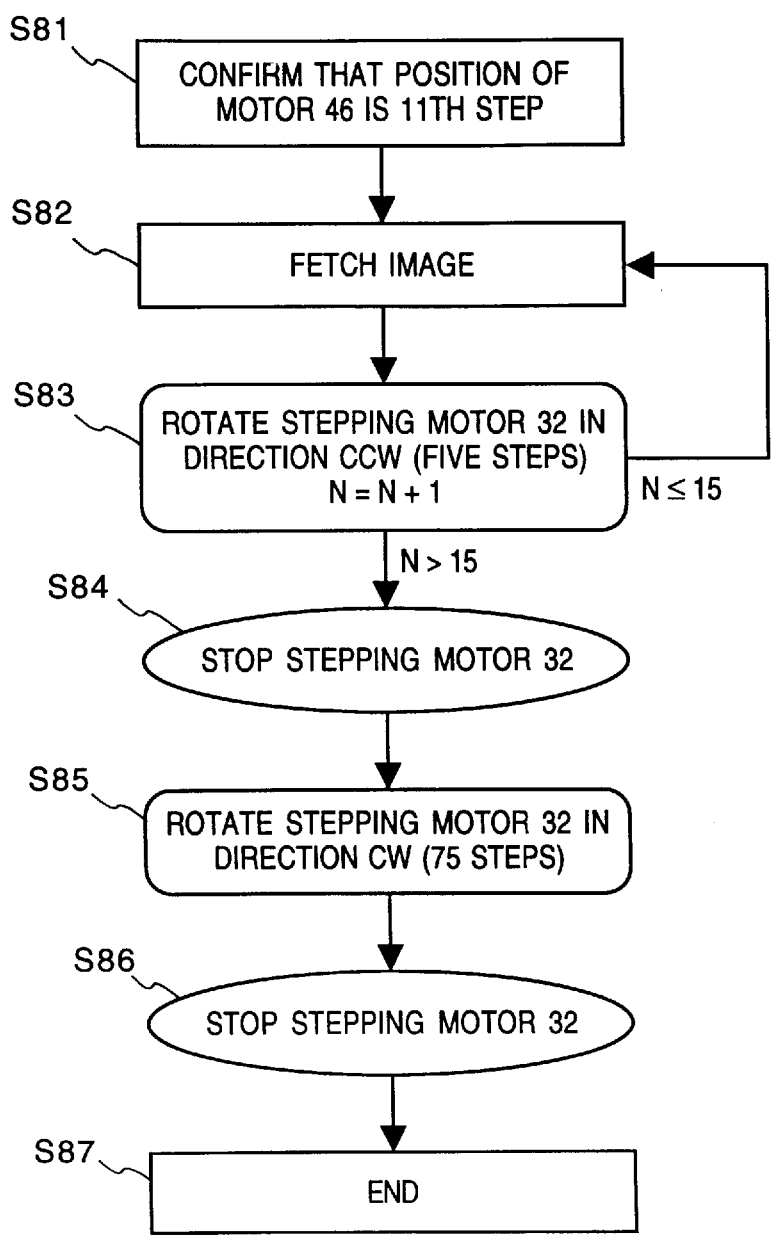
FIG. 14 is a flow chart showing the control sequence upon fetching of an image in the first embodiment.

The control sequence for fetching an image by performing a pixel displacement will be described below with reference to FIG. 14, FIG. 15, and FIGS. 16A to 16C. FIG. 14 is a flow chart showing the control operation of the X-direction cam 33 and the Y-direction cam 27 which cooperates with the cam 33. This processing is also executed by the system controller COM. FIG. 15 shows the order of fetching an image by performing the pixel displacement in accordance with the control sequence shown in FIG. 14, and the fetching range changes in the order of addresses 1 to 16 in FIG. 15.

The control sequence shown in FIG. 14 must be started after the initialization operations of the X- and Y-direction cams 33 and 27 and the rotation mechanism portion 5 are completed. Also, the control sequence shown in FIG. 14 is executed when a so-called "high image-quality mode" for fetching an image by performing a pixel displacement is selected. Therefore, when this control sequence is started, it is confirmed in step S81 if the quartz plate 41 moves to the position shown in FIG. 11C. The quartz plates 41 and 42 must serve as a low-pass filter in the high image-quality mode since high-frequency components are generated in an image signal upon execution of the pixel displacement, and must be removed.

In the high image-quality mode, a pixel displacement of a ½ pixel width is performed at a total of 16 positions, as shown in FIG. 15. As will be described above, when an operation for rotating the stepping motor 32 by five steps is repeated 16 times, the cam face of the X-direction cam 33 changes from $Fx_1$ to $Fx_4$, and the cam face of the Y-direction cam 27 changes from $Fy_1$ to $Fy_{16}$. Thus, the loop of step S82→step S83 in FIG. 14 is executed 16 times.

More specifically, in step S82 in FIG. 14, image information of the first surface (address 1 in FIG. 15) is fetched at this position. In step S83, the stepping motor 32 is rotated by 5 steps (through an angle of 20°), and image information of the second surface (address 2 in FIG. 15) displaced by a 0.5 pixel in the vertical direction on the surface of the image sensing element is fetched. Similarly, image information of each of the third surface (address 3 in FIG. 15) and the fourth surface (address 4 in FIG. 15) is fetched after 1- and 1.5-pixel displacements.

Referring to FIG. 9A, while the cam face of the X-direction cam 33 is $Fx_1$, i.e., while the rotation position of the X-direction cam 33 falls within the range from 0° to 80°, the cam face of the Y-direction cam 27 changes like $Fy_1, \ldots, Fy_4$. More specifically, while the X-direction cam 33 is rotated upon rotation of the stepping motor 32 and the cam pin 19 moves in the cam surface $Fx_1$ to maintain the same cam lift amount $Tx_1$, the cam pin 15 is moved in four steps ($Ty_4 \rightarrow Ty_3 \rightarrow Ty_2 \rightarrow Ty_1$) in the vertical direction by the cam surfaces ($Fy_1, \ldots, Fy_4$) of the Y-direction cam 27, thereby displacing the image fetching position in four steps. In FIG. 15, these operations correspond to the fetching operations of addresses 1 to 4.

Upon completion of four image fetching operations (N=4) in the vertical direction, the cam surface of the X-direction cam 33 shifts from $Fx_1$ to $Fx_2$ by the driving operation of the stepping motor 32, as shown in FIG. 9A, and its lift amount changes to $Tx_2$. At the same time, the face surface of the Y-direction cam 27 shifts from $Fy_4$ to $Fy_5$, and the lift amount of the Y-direction cam 37 changes from $Ty_1$ to $Ty_2$.

As can be seen from FIG. 15, even when the cam face of the X-direction cam 33 shifts from $Fx_1$ to $Fx_2$ upon movement of the pixel position from N=4 to N=5, no pixel displacement in the Y-direction is required. However, in the first direction, the cam lift amount of the Y-direction cam 27 changes from $Ty_1$ to $Ty_2$. This amounts to displacing the deflector by 0.5 pixels in the vertical direction.

This is because, in the arrangement of the first embodiment, i.e., in the arrangement shown in FIG. 7, the driving operations, in the vertical and horizontal directions, of the deflector 11 are not completely independent from each other, and the vertical component changes upon driving of the deflector in the horizontal direction.

More specifically, as can be seen from FIG. 7, the axis A about which the frame 12 rotates (by the pin 15) is defined on the frame 16 driven by the cam pin 19. Therefore, the rotation of the frame 16 influences the rotation of the frame 12. In the first embodiment, since the Y- and X-direction cams 27 and 33 are concentrated on one side (the right side in FIG. 7) of the driving portion 3, the cam pin 15 crosses the axis B at right angles. Therefore, upon rotation of the holding frame 16 about the axis B, the bearing portions 17 and 18 arranged on the frame 16 also rotate, and as a result, the frame 12 rotates about the axis B. Therefore, since the cam pin 15 of the holding frame 12 vertically shifts upon movement of the cam pin 19 of the holding frame 16, and is separated from or pressed against the cam surface 27a, the pixel displacement operations in the horizontal and vertical directions cannot be independently controlled in this state. For the sake of convenience, this movement of the deflector 11, i.e., the cam pin 15, will be referred to as an "interference movement" hereinafter. The cam surface of the Y-direction cam 27 must have a region for compensating for the interference movement of the pin 15 upon operation of the X-direction cam 33. In order to assure this compensation operation, a compensation region is formed on the cam surface of the Y-direction cam 27.

More specifically, when the cam face of the X-direction cam 33 shifts by one step from $Fx_1$ to $Fx_2$, and the holding frame 16 rotates in the horizontal direction, since the cam pin 15 of the holding frame 12 is not located on the axis B, the cam pin 15 is also displaced, and the holding frame 12 is about to be displaced in the vertical direction. In this case, when the cam surface of the Y-direction cam 27 contacting the cam pin 15 shifts from $Fy_4$ to $Fy_5$, the above-mentioned displacement, in the vertical direction, of the cam pin 15 is compensated for. As described above, by modifying the cam surface, the interference movement of the cam pin 15 is compensated for. In this manner, upon a change from N=4 to N=5, a pixel displacement for a 0.5 pixel is performed in only the horizontal direction.

Figure 9B:
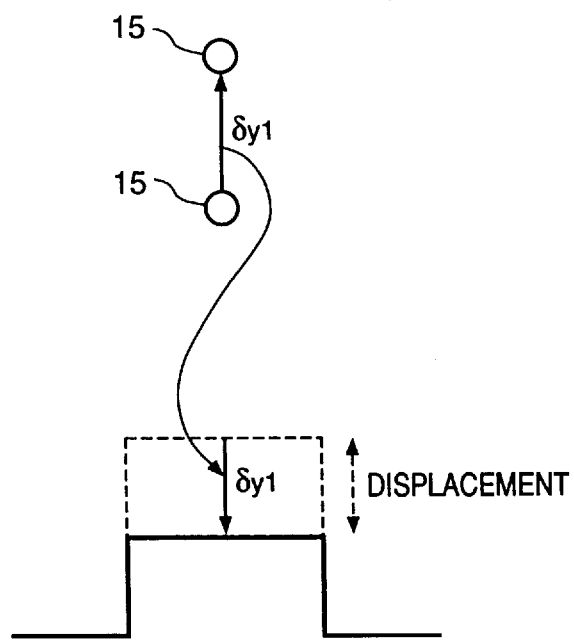
FIG. 9B is a view for explaining a modification of the cam surface of the Y-direction cam 27 so as to cancel an upward interference movement.
Figure 9C:
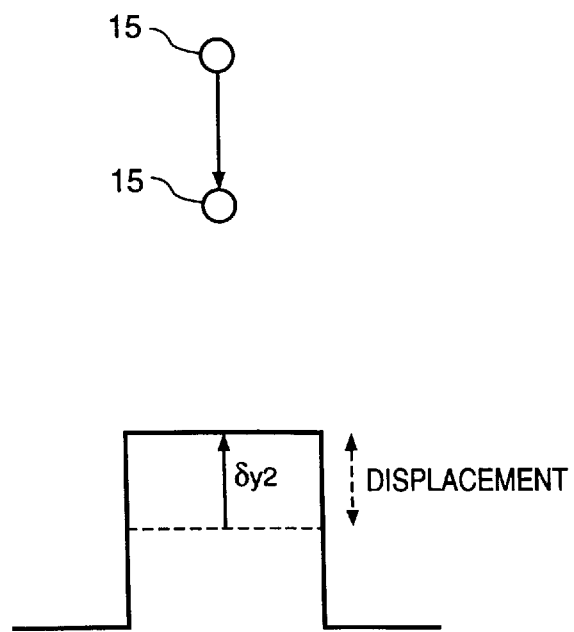
FIG. 9C is a view for explaining a modification of the cam surface of the Y-direction cam 27 so as to cancel a downward interference movement.

Generally speaking, in the apparatus of the first embodiment, a member suffering from interference is the pin 15. When the pin 15 moves upward by $\delta_{y1}$ upon rotation of the pin 19, as shown in FIG. 9B, the lift amount of the cam surface of the Y-direction cam 27 is decreased by $\delta_{y1}$, as shown in FIG. 9B. Even when the cam pin 15 moves downward while the frame 16 is located at the upper position upon upward movement of the pin 19, the pin 15 does not interfere with the frame 16 due to the presence of a notch 36 shown in FIG. 7. On the other hand, when the pin 15 moves downward by $\delta_{y2}$ upon rotation of the pin 19, as shown in FIG. 9C, the lift amount of the cam surface of the Y-direction cam 27 is increased by $\delta_{y2}$, as shown in FIG. 9C.

In the first embodiment, by appropriately setting the lengths of the pins 16 and 19 and the dimensions of the frames 12 and 16, each of the amounts $\delta_{y1}$ and $\delta_{y2}$ is matched with one unit (one graduation interval on the ordinate in FIG. 9A) of the cam lift amount. With this matching, cam design is facilitated.

The description will return to that of the flow chart in FIG. 14.

While the cam surface of the X-direction cam 33 is $Fx_2$ (N=5, 6, 7, 8), i.e., the rotation position falls within the range from 80° to 160° (the cam lift amount=$Tx_2$), the cam face of the Y-direction cam 27 changes like $Fy_5 \rightarrow Fy_6 \rightarrow Fy_7 \rightarrow Fy_8$, and its lift amount changes like $Ty_2 \rightarrow Ty_3 \rightarrow Ty_4 \rightarrow Ty_5$.

When the stepping motor 32 further rotates through 20°, since N=9, and a 0.5-pixel displacement must be performed in the X-direction, the cam face of the X-direction cam 33 becomes $Fx_3$. At this time, the cam face of the Y-direction cam 27 also changes to $Fy_9$ to compensate for the interference movement.

While the cam surface of the X-direction cam 33 is $Fx_3$ (N=9, 10, 11, 12), i.e., the rotation position falls within the range from 160° to 240° (the cam lift amount=$Tx_3$), the cam face of the Y-direction cam 27 changes like $Fy_9 \rightarrow Fy_{10} \rightarrow Fy_{11} \rightarrow Fy_{12}$, and its lift amount changes like $Ty_6 \rightarrow Ty_5 \rightarrow Ty_4 \rightarrow Ty_3$.

When the stepping motor 32 further rotates through 20°, since N=13, and a 0.5-pixel displacement must be performed in the X-direction, the cam face of the X-direction cam 33 becomes $Fx_4$. At this time, the cam face of the Y-direction cam 27 also changes to $Fy_{13}$ to compensate for the interference movement.

While the cam surface of the X-direction cam 33 is $Fx_4$ (N=13, 14, 15, 16), i.e., the rotation position falls within the range from 240° to 320° (the cam lift amount=$Tx_4$), the cam face of the Y-direction cam 27 changes like $Fy_{13} \rightarrow Fy_{14} \rightarrow Fy_{15} \rightarrow Fy_{16}$, and its lift amount changes like $Ty_4 \rightarrow Ty_5 \rightarrow Ty_6 \rightarrow Ty_7$.

As described above, in the loop of step S82→step S83, 16 images corresponding to FIG. 15 can be obtained. Then, the stepping motor 32 is stopped in step S84.

In steps S85 and S86, a sequence for returning the stepping motor 32 to its origin position is performed. More specifically, the motor 32 is rotated in the reverse direction by 75 steps to return to the initial position (the position where the pins 15 and 19 respectively contact the faces $Fy_1$ and $Fx_1$).

Note that the state shown in FIG. 7 represents a state wherein the pin 19 contacts the face $Fx_3$ of the X-direction cam 33 and the pin 15 contacts the face $Fy_{11}$ of the Y-direction cam 27, i.e., represents a state wherein the rotation position of each cam is 200°, and the motor 32 has been rotated by 56 steps from the origin, in correspondence with FIG. 9A.

When images for 16 surfaces are fetched, the system controller COM stores these images in the memory MEM. When an image is to be output, 16 images are synthesized by controlling the read addresses and read timings, and a synthesized image is output.

Figure 16A:
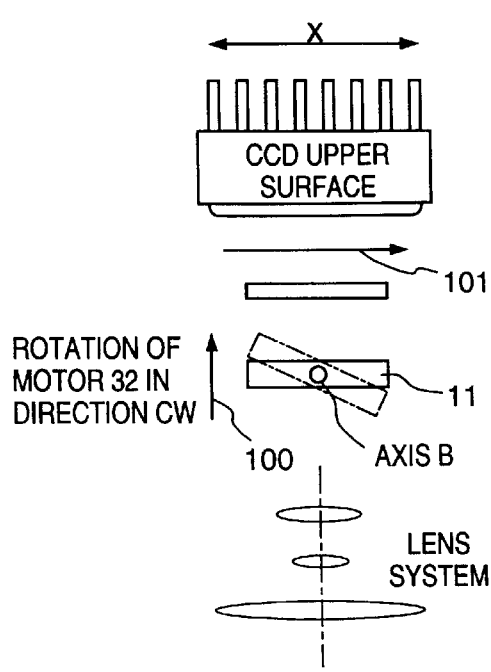
FIG. 16A is a view showing the relationship between the driving direction of the motor 32 and a deflector 11, and X-direction pixel displacement.
Figure 16B:
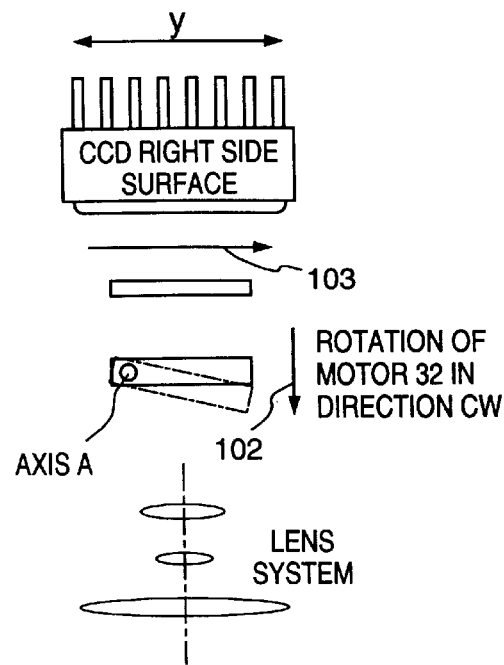
FIG. 16B is a view showing the relationship between the driving direction of the motor 32 and a deflector 11, and Y-direction pixel displacement.
Figure 16C:
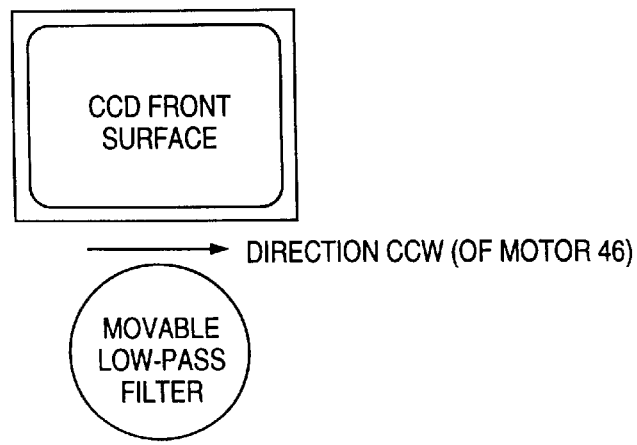
FIG. 16C is a view showing the relationship between the driving directions of a motor 46 and the low-pass filter.

FIGS. 16A to 16C show the operation directions of the X- and Y-direction cams 33 and 27 and the rotation mechanism portion 5 of the first embodiment. FIG. 16A is a view for explaining the operation of the X-direction cam 33, FIG. 16 is a view for explaining the operation of the Y-direction cam 27, and FIG. 16C is a view for explaining the operation of the rotation mechanism portion 5. More specifically, when the motor 32 is rotated in the direction CW in FIG. 16A, the pin 19 moves in a direction 100 to rotate the deflector 11 about the axis B, thus achieving an X-direction pixel displacement in a direction 101. When the motor 32 is rotated in the direction CW in FIG. 16B, the pin 15 moves in a direction 102 to rotate the deflector 11 about the axis A, thus achieving a Y-direction pixel displacement in a direction 103. When the motor 46 is rotated in the direction CCW in FIG. 16C, the apparatus is set in the high image-quality mode.

Figure 17:
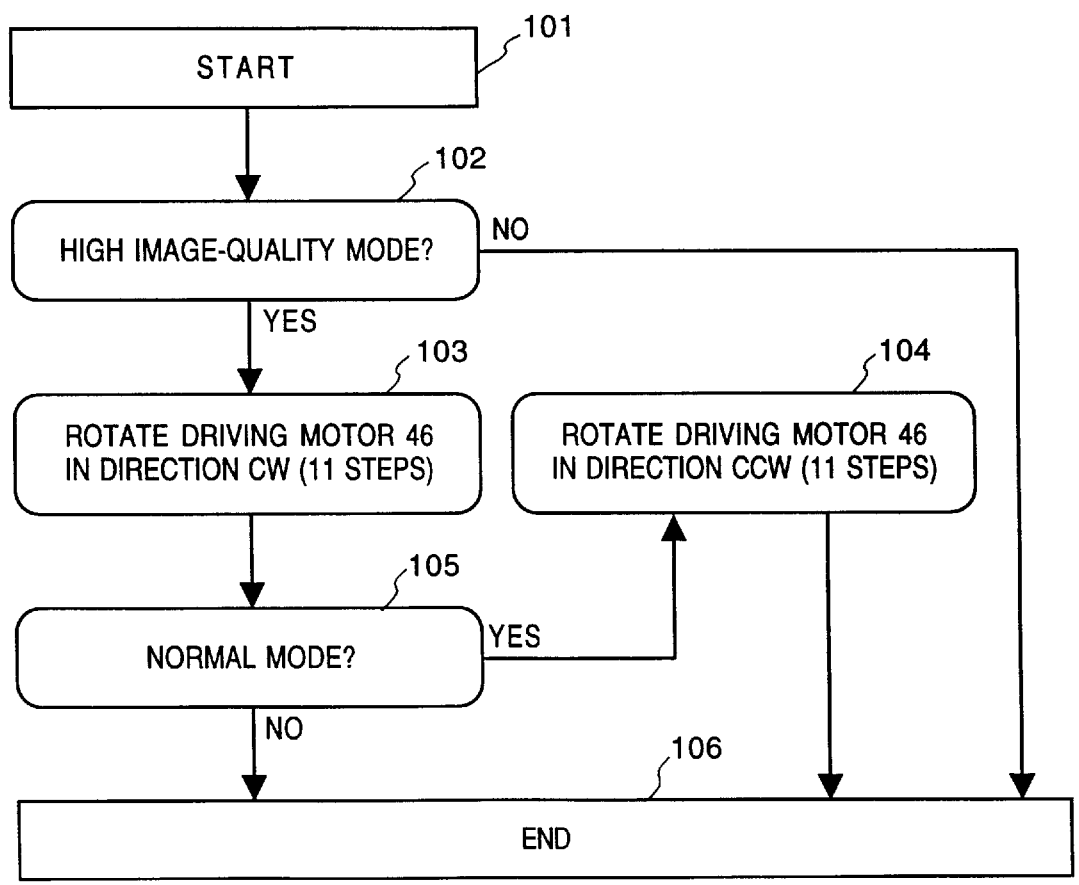
FIG. 17 is a flow chart showing the rotation operation of the low-pass filter rotation mechanism portion 5.

FIG. 17 is a flow chart showing the control sequence of the rotation mechanism portion 5 when one of the high image-quality mode and the normal mode is selected upon execution of an image fetching operation.

More specifically, it is checked in step S102 if the high image-quality mode or the normal mode is selected. This selection is made by a user using a switch (not shown).

If the normal mode is selected, the flow advances to step S106. In the normal mode, execution of the control sequence shown in FIG. 14 is not required. On the other hand, if it is determined in step S102 that the high image-quality mode is selected, the motor 46 is rotated by 11 steps in step S103 to locate the quartz plate 41 at the position shown in FIG. 11C. FIG. 13B shows the cut-off frequency at this time. If the high image-quality mode is selected, the flow advances to step S106, and a confirmation signal indicating that the motor 46 has reached the high image-quality mode position is supplied to step S81 (FIG. 14). If a user wants to return to the normal mode, the flow advances from step S105 to step S104, and the motor is reversed by 11 steps in the CCW direction. With this reverse rotation, the quartz plate 41 moves to the position shown in FIG. 11A, thus lowering the function of the quartz plate 41 as a low-pass filter.

The switching operation of the quartz plate 41 shown in the flow chart of FIG. 17 may be performed in cooperation with the above-mentioned pixel displacements upon operation of the X- and Y-direction cams 33 and 27 so as to improve operability. Conversely, these operations may be independently performed as needed. For example, the cut-off frequency band of the optical low-pass filter may be broadened to generate moiré by utilizing the switching operation of the quartz plate 41 in focus adjustment so as to perform fine focus adjustment, thus allowing accurate adjustment.

As described above, according to the image sensing apparatus of the first embodiment, the following effects are expected.

Since the pin 19 for rotating the deflector 11 in the X-direction and the pin 15 for rotating the deflector 11 in the Y-direction are arranged on the same side with respect to the deflector 11, a size reduction of the image sensing apparatus can be attained.

Since the pins 15 and 19 are arranged at the same side, these pins can be driven by a single motor, and a further size reduction of the apparatus can be attained.

The interference movement of the pin 15 caused by the arrangement that the pins 15 and 19 are arranged at the same side can be eliminated by modifying the shape of the cam surface of the Y-direction cam 27 to cancel the interference movement (see FIGS. 9B and 9C).

Since the low-pass filter having a variable cut-off frequency is arranged, optimal frequencies can be selected in the high image-quality mode and the normal mode.

<Second Embodiment>

The second embodiment of the present invention will be described below with reference to FIG. 18.

Figure 18:
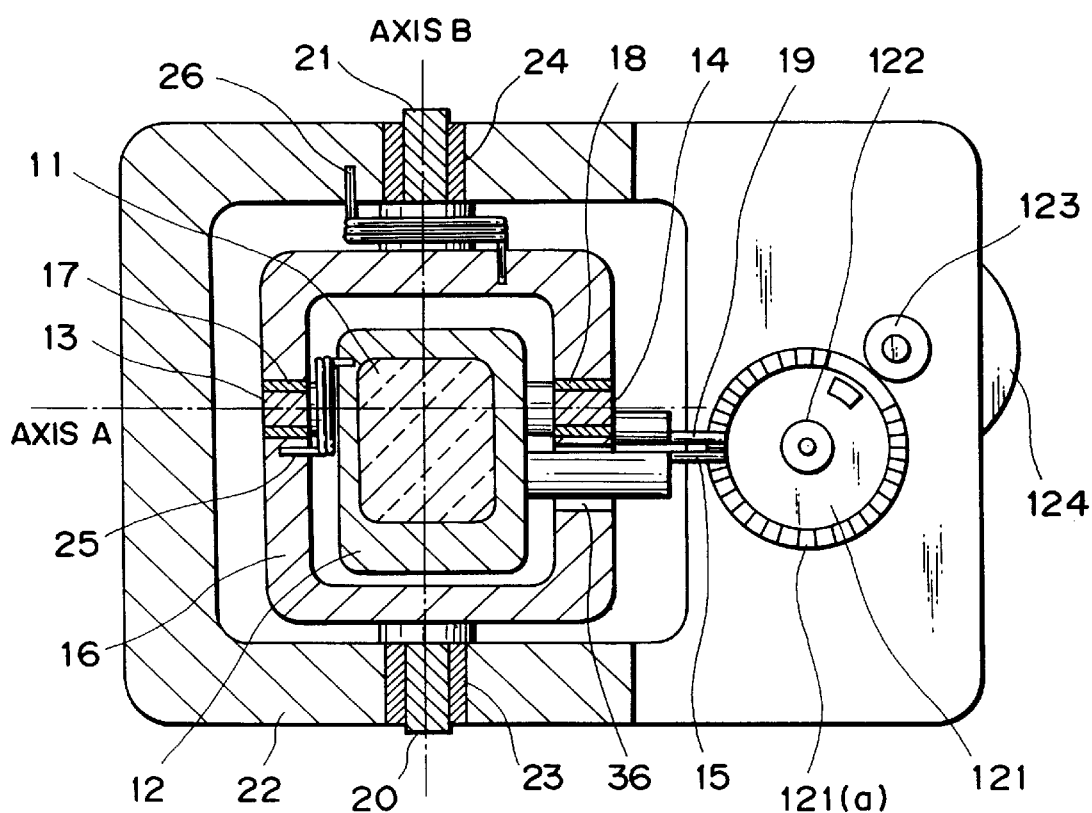
FIG. 18 is a schematic view showing a deflector driving portion according to the second embodiment of the present invention.

FIG. 18 shows the deflector driving portion 3 when viewed from the optical axis principal plane on the lens side. In FIG. 18, the deflector 11 is driven by a single cam 121. Since the single cam is used, the pins 15 and 19 which are in sliding contact with the cam are arranged to be closer to each other than in the first embodiment. Since the arrangement other than the cam is the same as that in the first embodiment, the same reference numerals in this embodiment denote the same parts as in the first embodiment, and the arrangement and operation of the cam 121 will be mainly described below.

Referring to FIG. 18, the cam 121 rotatably engages with a shaft portion 122 formed on the base 22, and a gear portion (not shown) is formed on the outer circumferential portion of the cam 121. The gear portion meshes with a pinion 123 which is press-fitted on the output shaft of a stepping motor 124 as a driving source.

The cam pin 19 attached to the holding frame 16 for movement in the X-direction and the cam pin 15 attached to the holding frame 12 for movement in the Y-direction contact a cam surface 121a of the cam 121 via the coils springs 25 and 26. When the cam 121 rotates, the cam pins 19 and 15 are driven to follow the rotation, thus displacing the deflector 11 by a very small amount.

The cam surface 121a of the cam 121 has cam lifts corresponding to those of the X- and Y-direction cams 33 and 27 in the first embodiment.

Figure 19A:
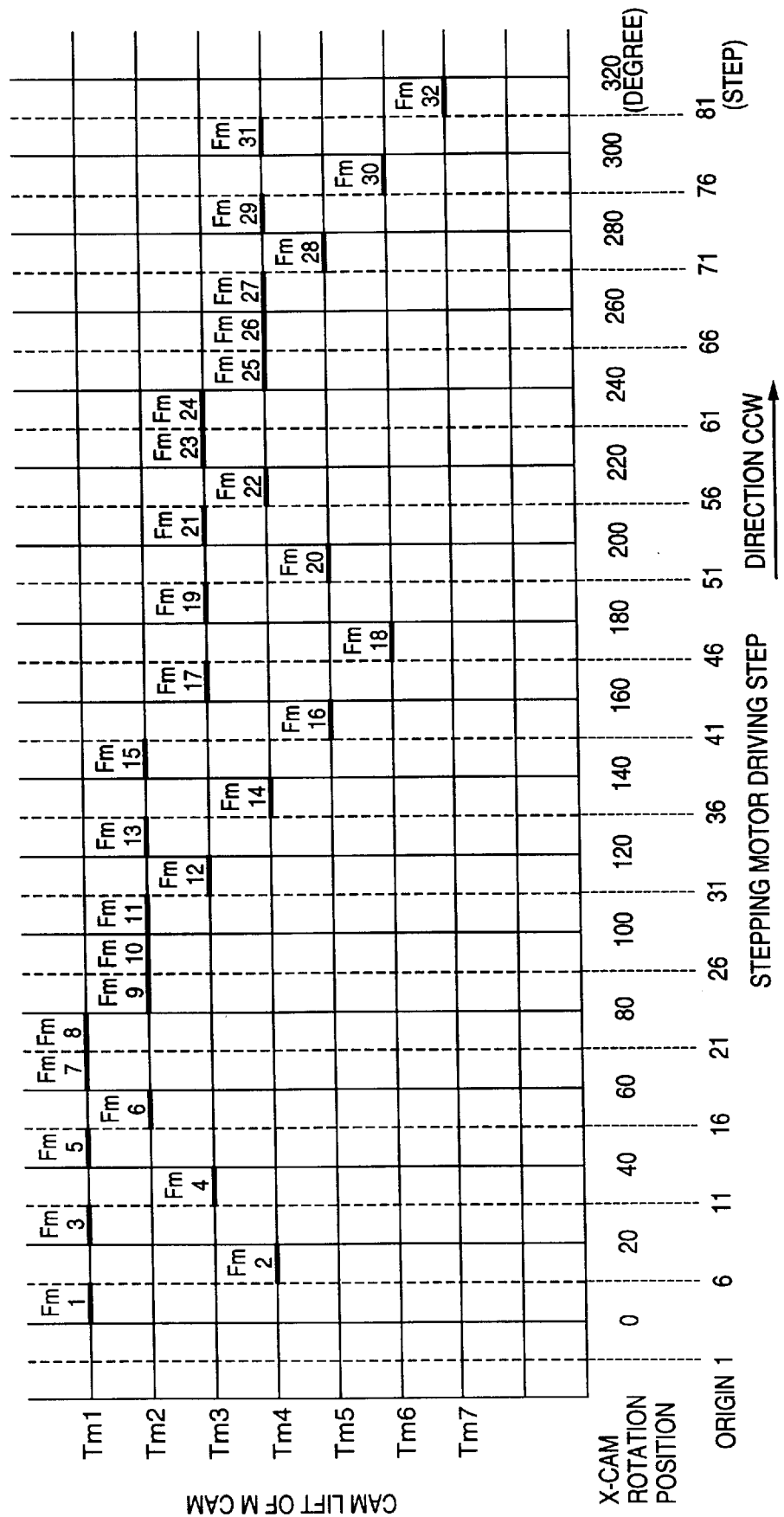
FIG. 19A is a graph showing the relationship between the cam rotation position and cam lift in the second embodiment.

FIG. 19A shows the relationship between the rotation position and cam lift of the cam 121.

In FIG. 19A, the abscissa represents the cam surface position of the cam 121, in other words, the rotation position of the cam. This rotation position is expressed by an angle θ (degree) in the counterclockwise direction from one end position of the first face surface (a face surface $Fm_1$) when viewed from the cam surface, and is also expressed by the number of driving steps of the stepping motor 124. The number of driving steps is the number of driving steps of the stepping motor 124 from the initial position to the central position of each face surface. The ordinate represents the cam lift (cam surface height) at the contact position of the cam pin 19 (or the cam pin 15).

Figure 19B:
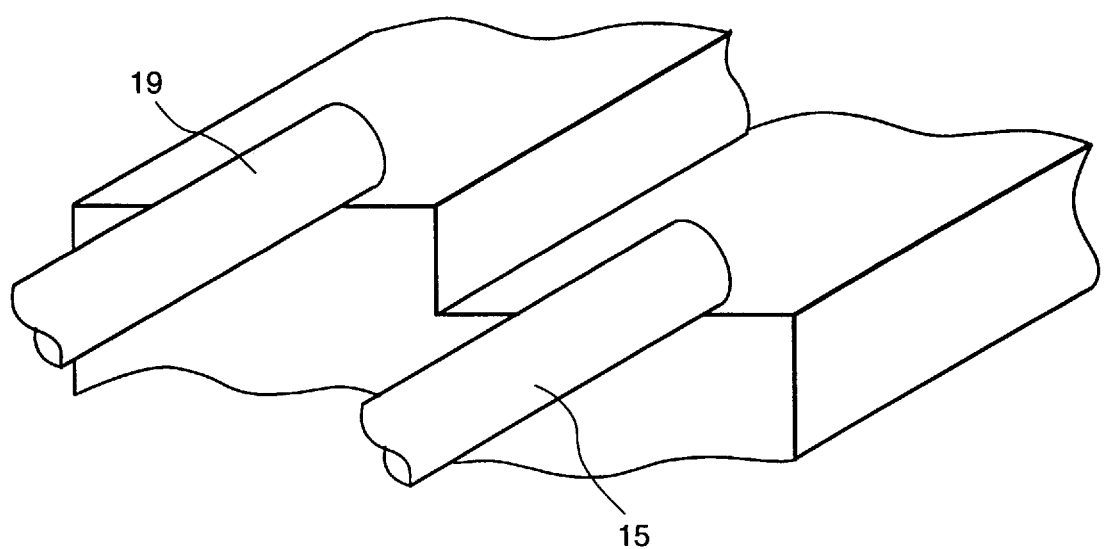
FIG. 19B is a view showing a state wherein two cam pins 15 and 19 are close to each other in the second embodiment.

As shown in FIG. 19A, the cam 121 has 32 cam faces $Fm_1$ to $Fm_{32}$. As shown in FIG. 19B, in the second embodiment, since the cam pins 15 and 19 contact the single cam 121 in the vicinity of each other, a cam face which is in sliding contact with the cam pin 15 neighbors a cam face which is in sliding contact with the cam pin 19. More specifically, the two cam faces which define the position of the deflector 11 at a given timing and are concurrently in sliding contact with the pins 15 and 19 correspond to a group of neighboring cam faces. In the example shown in FIG. 19A, the faces $Fm_1$ and $Fm_2$ form one group; the faces $Fm_3$ and $Fm_4$ form one group; . . . , the faces $Fm_{15}$ and $Fm_{16}$ form one group.

In the second embodiment, the cam lift amount for one step corresponds to a 0.5 pixel in a pixel displacement. One step of the stepping motor 124 corresponds to a rotation angle of 4° of the cam 121.

In the second embodiment, the cam 121 is driven upon rotation of the motor 124. When the motor 124 rotates, the cam 121 (to be also referred to as an "M cam" hereinafter for the sake of convenience) rotates, and the cam faces which are in sliding contact with the pins 15 and 19 move from the left to right in FIG. 19A.

In the second embodiment, a pixel displacement is performed at 16 positions, as shown in FIG. 20, as in the first embodiment. If the pixel position is N=1, 2, 3, . . . , 16 in turn for the sake of convenience, as shown in FIG. 20, in order to define the pins 15 and 19 to perform an image sensing operation at the position N=1, the pins 19 and 15 must contact the cam faces ($Fm_1$, $Fm_2$); in order to perform an image sensing operation at the position N=2, the pins 19 and 15 must contact the cam faces ($Fm_3$, $Fm_4$); . . . , in order to perform an image sensing operation at the position N=16, the pins 19 and 15 must contact the cam faces ($Fm_{31}$, $Fm_{32}$).

When the motor 124 rotates within the angle range from 0° to 80°, the cam face contacting the pin 19 changes like $Fm_1 \rightarrow Fm_3 \rightarrow Fm_5 \rightarrow Fm_7$, but the cam lift amount $Tm_1$ is maintained. In contrast to this, the cam face contacting the pin 15 changes like $Fm_2 \rightarrow Fm_4 \rightarrow Fm_6 \rightarrow Fm_8$, and the cam lift amount changes like $Tm_4 \rightarrow Tm_3 \rightarrow Tm_2 \rightarrow Tm_1$. Therefore, when the motor 124 rotates within the angle range from 0° to 80°, pixel displacements at the pixel positions N=1 to N=4 can be attained.

In the second embodiment, a compensation region must be formed on the cam 121 to prevent a mutual interference upon operation of the cam pins 19 and 15 as in the first embodiment. For this purpose, in the second embodiment, the 32 cam faces have seven different cam lift amounts $Tm_1$ to $Tm_7$. Furthermore, the stepwise minimum change amount (one scale of Tm) of the cam lift amount for a pixel displacement is matched with the minimum change amount ($Tm_1 \rightarrow Tm_2$, $Tm_2 \rightarrow Tm_3$, $Tm_3 \rightarrow Tm_4$), thus simplifying the shape of the cam.

More specifically, in FIG. 19A, at the rotation position of 0° of the cam 121, the cam faces $Fm_1$ and $Fm_2$ respectively contact the cam pins 19 and 15. At this time, the cam pin 19 for controlling the position, in the horizontal direction, i.e., the X-direction, of the deflector 11 is located at a position having a cam lift amount $Tm_1$, and the cam pin 15 for controlling the position, in the vertical direction, i.e., the Y-direction, of the deflector 11 is located at a position having a cam lift amount $Tm_4$. Subsequently, as the cam 121 rotates through 20°, 40°, and 60°, the cam pins 19 and 15 respectively move to the cam faces ($Fm_3$, $Fm_4$), ($Fm_5$, $Fm_6$), and ($Fm_7$, $Fm_8$). During this interval, the cam pin 19 for controlling the position, in the horizontal direction, i.e., the X-direction, of the deflector 11 shifts to the faces $Fm_3$, $Fm_5$, and $Fm_7$ to maintain the same cam lift amount $Tm_1$, and the cam pin 15 for controlling the position, in the vertical direction, i.e., the Y-direction, of the deflector 11 shifts to the faces $Fm_2$, $Fm_4$, and $Fm_6$ to change its cam lift amount stepwise like $Tm_3$, $Tm_2$, and $Tm_1$. More specifically, the deflector 11 does not move in the horizontal direction, but moves in the vertical direction in four steps, thus performing four image fetching operations (N=1 to 4).

When the cam 121 rotates through 80°, 100°, 120°, and 140°, the cam pins 19 and 15 respectively move to ($Fm_9$, $Fm_{10}$), ($Fm_{11}$, $Fm_{12}$), ($Fm_{13}$, $Fm_{14}$), and ($Fm_{15}$, $F_{m16}$). The cam pin 19 for controlling the position, in the horizontal direction, i.e., the X-direction, of the deflector 11 is displaced to a position having a cam lift amount $Tm_2$, and is held at this cam lift position until the four image fetching operations are completed. On the other hand, the cam pin 15 for controlling the position, in the vertical direction, i.e., the Y-direction, of the deflector 11 moves to the faces $Fm_{10}$, $Fm_{12}$, $Fm_{14}$, and $Fm_{16}$ to change its cam lift amount stepwise from $Tm_2$ to $Tm_3$, $Tm_4$, and $Tm_5$. More specifically, the deflector 11 does not move in the horizontal direction to maintain the cam lift amount $Tm_2$, but moves in the vertical direction in four steps, thus performing four image fetching operations.

In this case, since the cam lift amount of the cam pin 19 changes from $Tm_1$ to $Tm_2$, and the deflector 11 moves in the X direction, the cam pin 15 is also displaced. In order to correct this displacement, the cam lift position of the cam pin 15 is shifted by three steps from $Tm_2$ to $Tm_5$.

Thereafter, the pixel displacement operation is similarly performed while correcting the shift position in the Y-direction each time the deflector 11 moves in the X-direction.

In the above-mentioned arrangement, when the cam 121 rotates, the cam pins 19 and 15 are driven upon rotation of the cam 121, and the deflector 11 is displaced. In this embodiment, a face cam having a cam surface in the thrust direction of the cam 121 has been exemplified. However, in principle, the same applies to a radial cam having a cam surface in the radial direction.

Note that the second embodiment is characterized by using a single cam as compared to the first embodiment. Since a single cam is used, the cam pins 19 and 15 are arranged in the vicinity of each other, and a pair of face cams which are in sliding contact with these cam pins are also formed adjacent to each other. The present invention is not limited to the image sensing apparatus in which the distance between the cam pins is short such that they respectively contact neighboring cam faces. For example, the cam faces which are in sliding contact with the cam pins 19 and 15 may be separated by two or more faces like ($Fm_1$, $Fm_4$), ($Fm_2$, $Fm_6$), ($Fm_3$, $Fm_8$), . . . .

The second embodiment described above can attain all the effects of the first embodiment. Furthermore, since the single cam is used, the apparatus can be made more compact than the first embodiment.

<Third Embodiment>

In the first and second embodiments, the two cam pins (19, 15) are driven by the single stepping motor (32, 124). The third embodiment has as its object to simplify the cam structure using two stepping motors.

Figure 21:
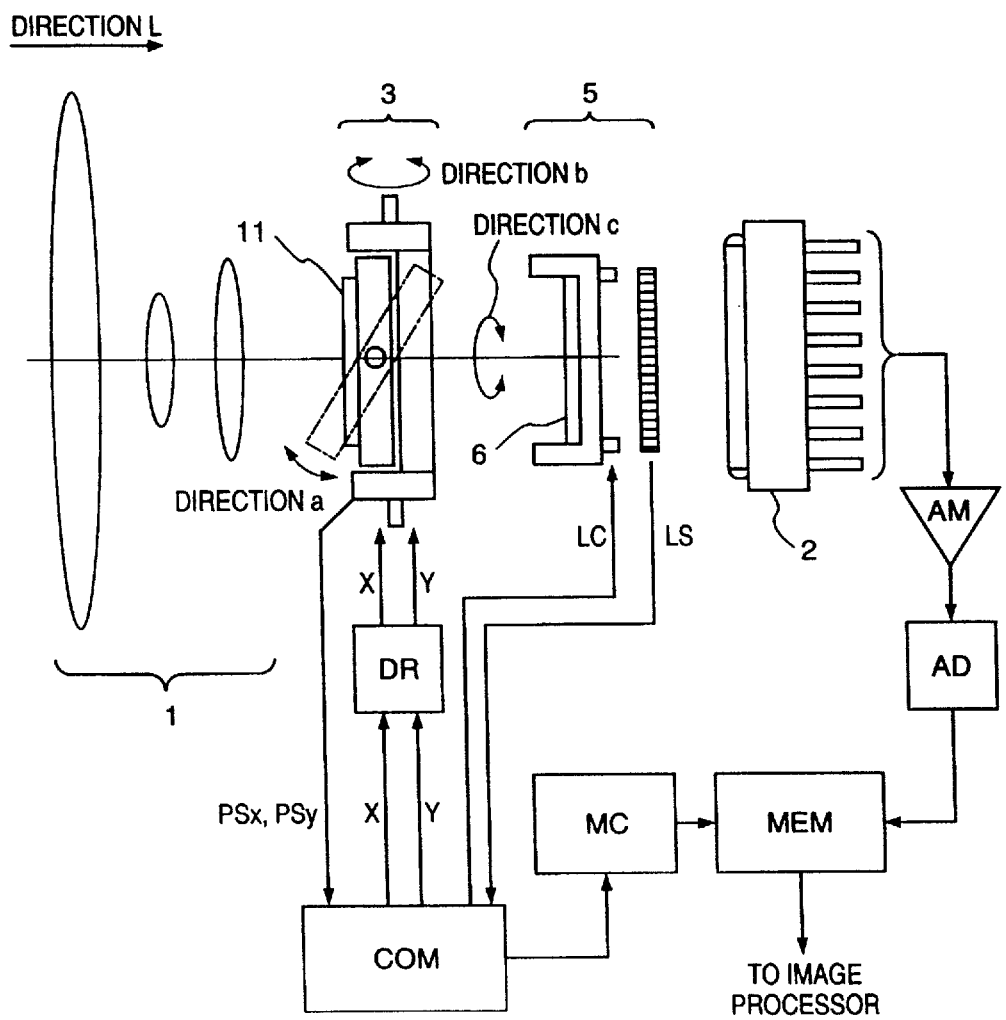
FIG. 21 is a schematic block diagram of an image sensing apparatus according to the third embodiment.

FIG. 21 shows the arrangement of an image sensing apparatus according to the third embodiment. As can be seen from a comparison between FIGS. 6 and 21, the image sensing apparatus of the third embodiment is not so different from that of the first embodiment. Since the apparatus of the third embodiment is driven by two stepping motors, the driving circuit DR outputs two driving signals X and Y to the system controller COM, and the driving portion 3 outputs two signals PSx and PSy indicating the phases of the cams to the system controller COM.

Figure 22:
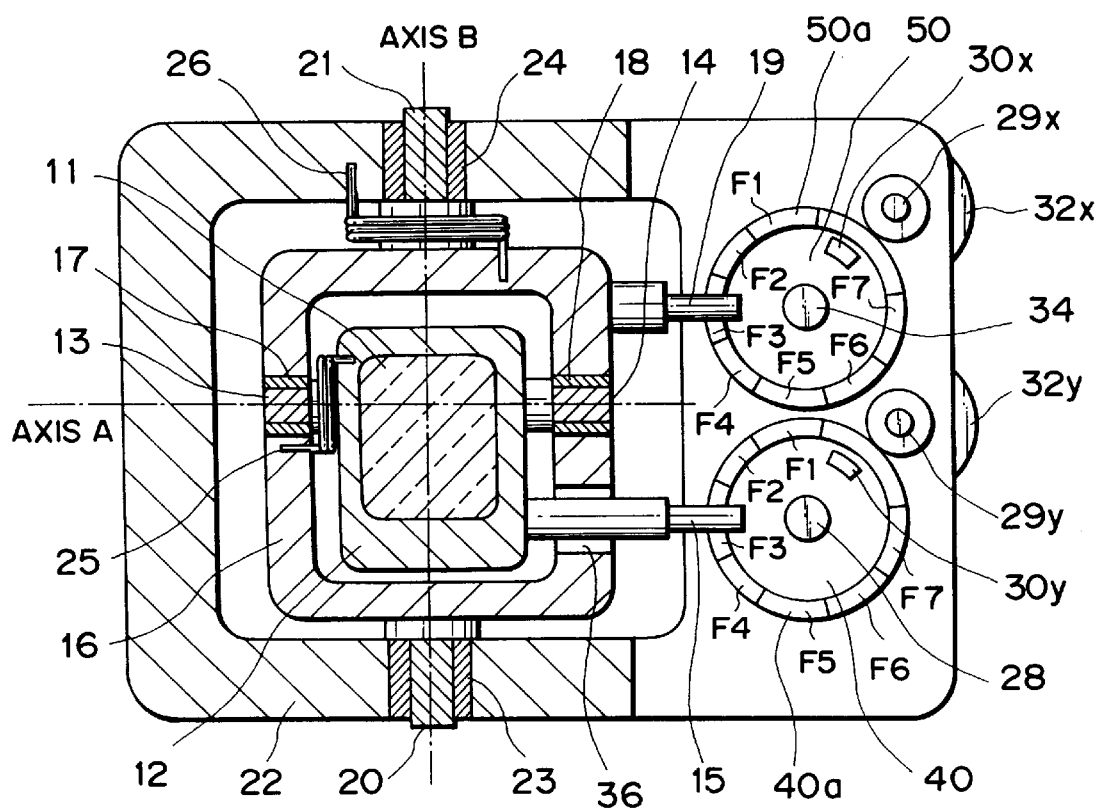
FIG. 22 is a schematic view of a deflector driving portion of the third embodiment.

FIG. 22 shows the arrangement of the driving portion 3 of the image pickup apparatus according to the third embodiment. The arrangement of the third embodiment will be described below while comparing FIG. 22 with FIG. 7 (first embodiment).

Figure 23:
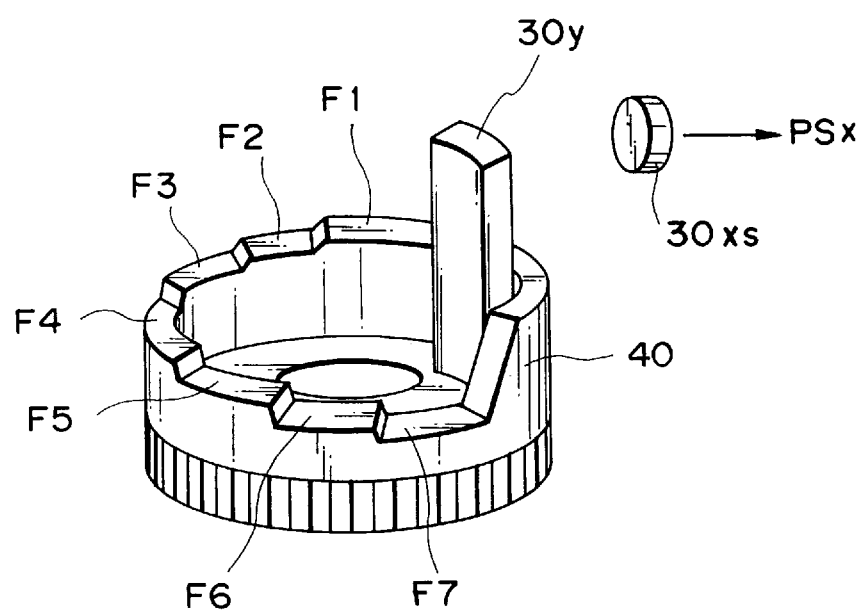
FIG. 23 is a perspective view showing the outer appearance of Y- and X-direction cams 40 and 50 used in the third embodiment.

The structures and dispositions of the deflector 11, the frames 12 and 16, the pins 15 and 19, and the like of the third embodiment are the same as those in the first embodiment. In the third embodiment, an X-direction cam 50 and a Y-direction cam 40 are arranged, and these cams have the same shape, as shown in FIG. 23 (FIG. 23 shows only the Y-direction cam 40 for the sake of simplicity). As shown in FIG. 22, the Y-direction cam 40 is driven by a stepping motor 32y via a pinion 29y, and the X-direction cam 50 is driven by a stepping motor 32x via a pinion 29x.

FIG. 23 is a perspective view showing the outer appearance of the Y-direction cam 40. In this embodiment, a cam obtained by molding a fluorine-containing PPS resin is used to improve the slidability of the cam surface as in the first embodiment. Alternatively, the cam may consist of brass, an iron alloy, or the like, and a lubricant may be coated on the sliding surface.

The face surfaces (F1, F2, . . . , F7) of the Y-direction cam 40 (also, the X-direction cam 50) constitute resting cam surfaces (a cam which is displaced stepwise) having seven different cam lift amounts (T1, T2, . . . , T7). In the region of each face surface, the height remains the same, and hence a change in cam lift can be absorbed even when the attachment phase of the stepping motor deviates.

Figure 24:
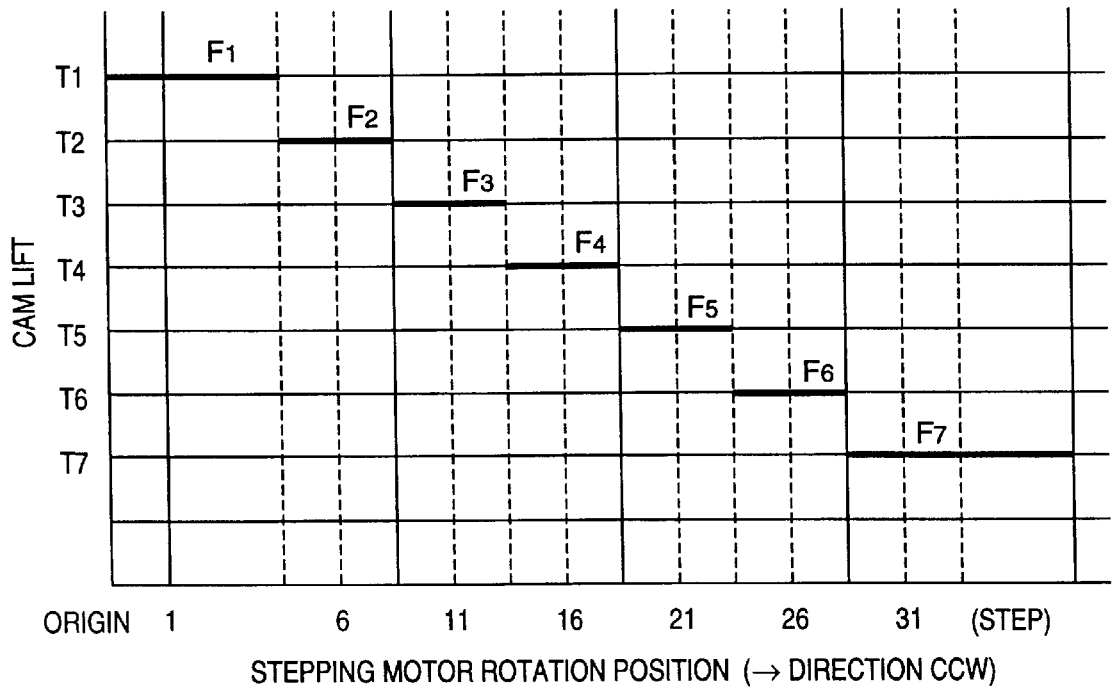
FIG. 24 is a graph showing the relationship between the cam rotation position and cam lift in the third embodiment.

The relationship between the cam lift amount and the cam rotation position of the Y-direction cam 40 (also, the X-direction cam 50) is as shown in FIG. 24. In FIG. 24, the abscissa represents the rotation position of the Y-direction cam 40 (or the X-direction cam 50) when the initial position is defined as an origin, and the rotation position is represented by the face surface position and the number of rotation steps (1, . . . , 6, . . . , 11, . . . ) of the stepping motor from the origin. The rotation direction of the stepping motor is the counterclockwise (CCW) direction. The ordinate represents the cam lift amount (T1, T2, . . . , T7) at the contact position of the cam pin 15 (or the cam pin 19).

As can be seen from FIG. 24, the position where the stepping motor is driven by one step from the origin corresponds to the face F1, the position where the motor is further driven by five steps corresponds to the face F2, and the position where the motor is further driven by five steps corresponds to the face F3, . . . . More specifically, each cam surface has a 5-step width. The cam lift amounts (cam surface heights) of the cam faces F1, F2, F3, . . . , F7 are respectively T1, T2, . . . , T7, and the cam faces are disposed so that the difference between the cam lift amounts of the neighboring face surfaces generates a pixel displacement operation for a 0.5 pixel (½ the pixel interval of the image sensing element). Note that the rotation direction of the stepping motor 32y at this time is the counterclockwise (CCW) direction when viewed from the motor output shaft.

In FIG. 23, a sensor 30xS is an initial position sensor corresponding to the sensor 30$_S$ in the first embodiment, and sets a signal PSx at HIGH level when a projection 30y approaches.

Since the arrangement of the filter rotation mechanism portion 5 of the third embodiment is the same as that of the first embodiment, a detailed description thereof will be omitted.

Figure 25:
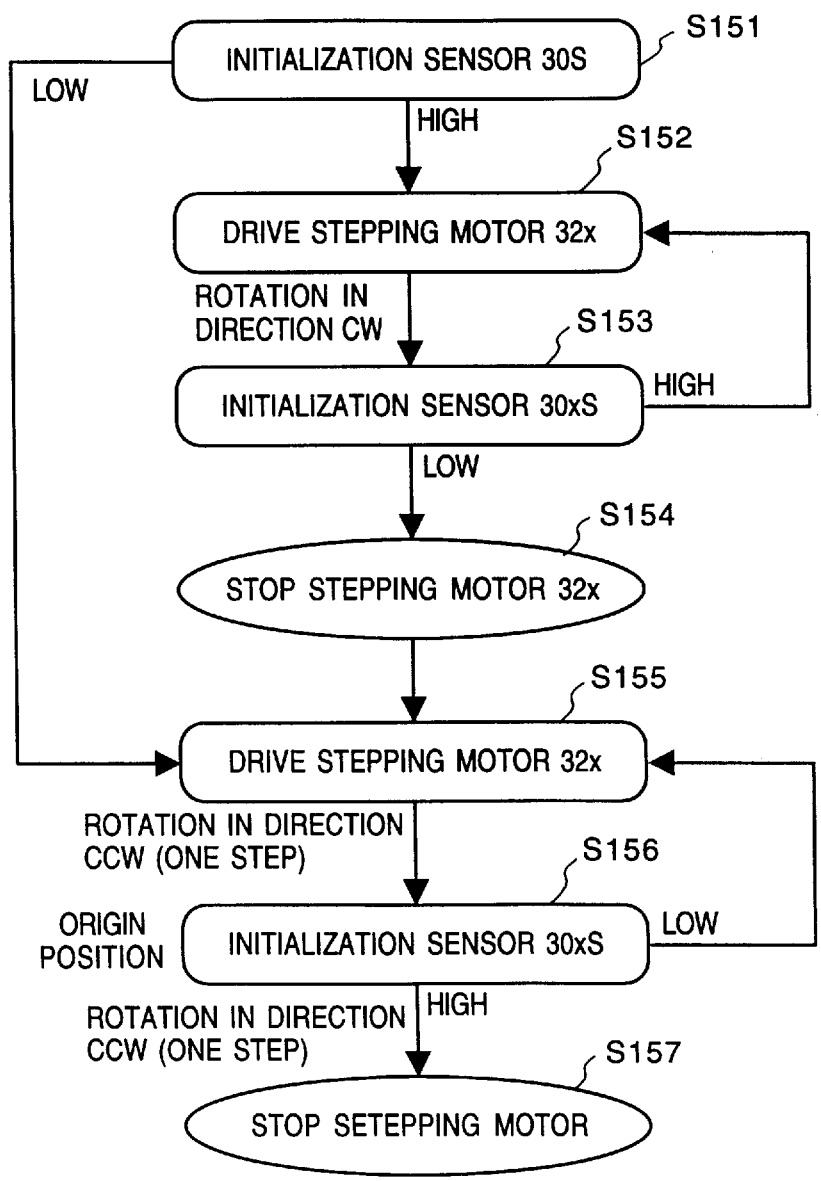
FIG. 25 is an initialization flow chart of the X-direction cam 50 of the third embodiment.
Figure 26:
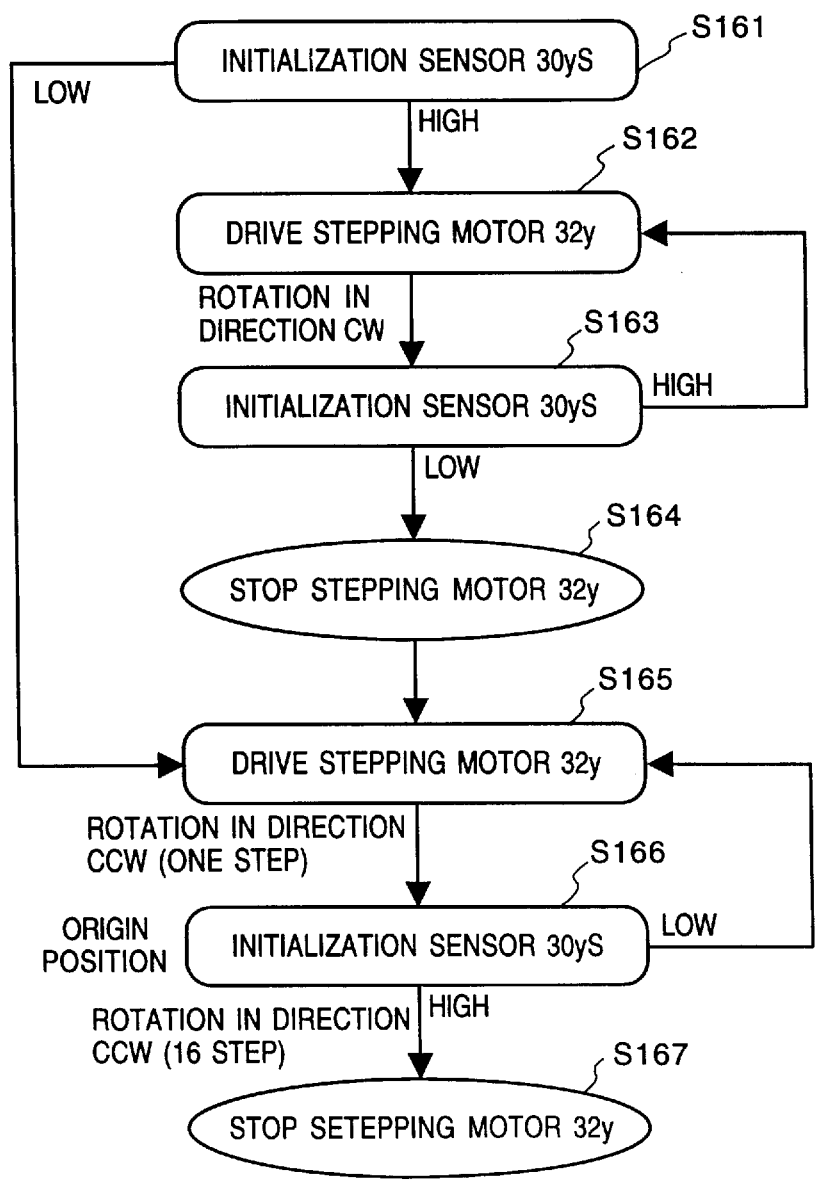
FIG. 26 is an initialization flow chart of the Y-direction cam 40 of the third embodiment.
Figure 28:
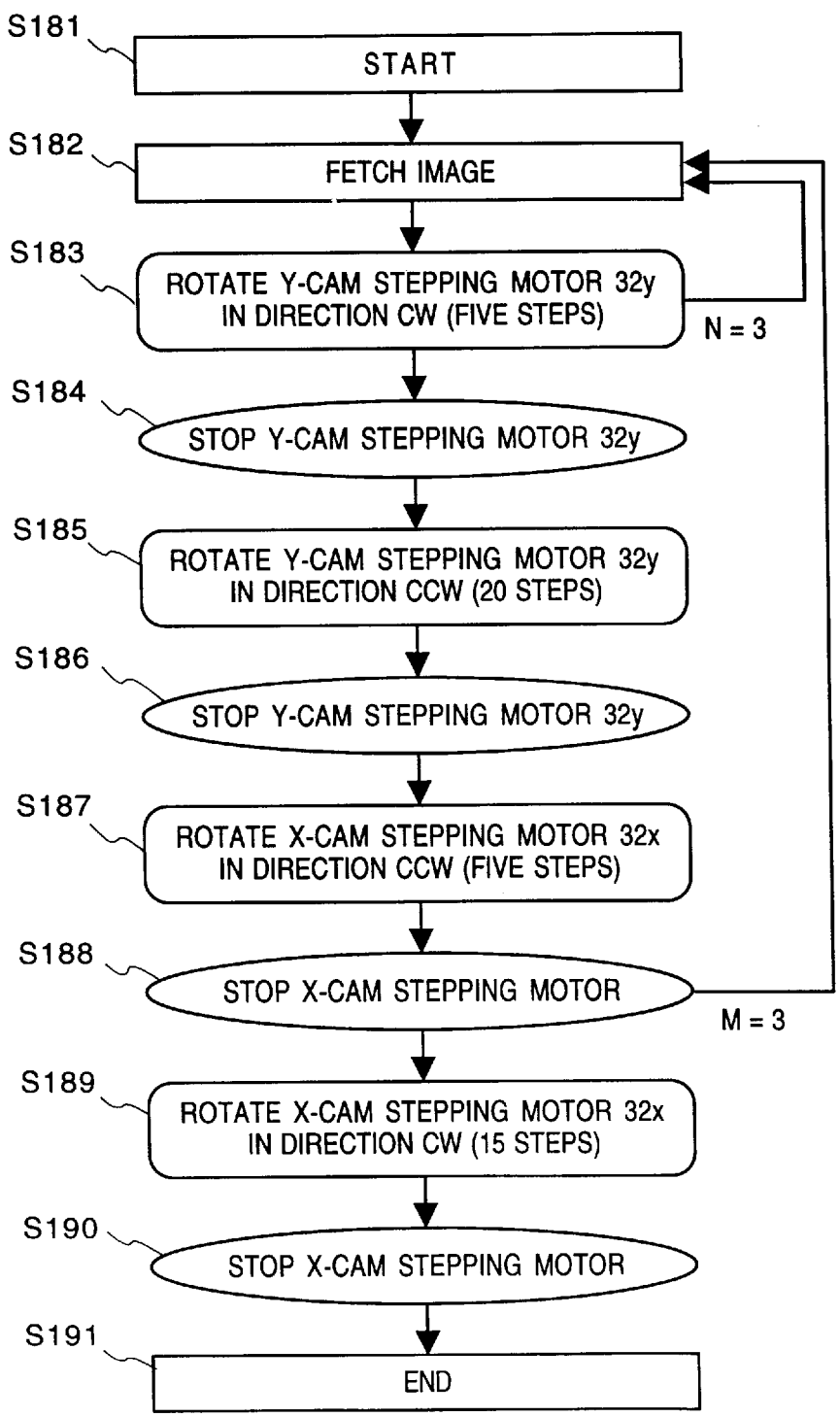
FIG. 28 is a flow chart showing the image fetching control sequence for the third embodiment.

FIG. 25 shows the initialization control sequence of the X-direction cam 50 (i.e., the motor 32x), FIG. 26 shows the initialization control sequence of the Y-direction cam 40 (i.e., the motor 32y), and FIG. 28 shows the initialization control sequence of the rotation mechanism portion 5 (i.e., the motor 48).

The initialization sequence of the X-direction cam 50 will be described below with reference to FIG. 25. The initial position of the cam 50 is defined as a position where the output from the sensor 30xS changes from LOW level to HIGH level. When the power supply voltage is supplied to the deflector driving portion 3, it is checked in step S151 if the output from the initialization sensor 30xS is at HIGH or LOW level. If the output is already at LOW level, i.e., since the sensor 30xS does not detect a projection 30x, the flow advances to step S155 to rotate the motor 32x in the direction CCW until the output from the sensor 30xS changes to HIGH level (until the sensor 30xS detects the projection 30x). When the sensor output changes to HIGH level, the system controller COM recognizes this position as the initial position. The motor 32x is further rotated by one step in the direction CCW, and is stopped.

If it is determined in step S151 that the output from the sensor 30xS is at HIGH level, since the X-direction cam 50 may be excessively rotated (the motor 32x may be excessively rotated in the direction CCW), the motor 32x is rotated in the direction CW until the output from the sensor 30xS changes to LOW level in step S152→step S153. When the output from the sensor 30xS changes to LOW level, the flow advances to step S154 to stop the motor 32x, and the flow then advances to step S155. In step S155→step S156, the motor 32x is rotated in the direction CCW until the output from the sensor 30xS changes to HIGH level (until the sensor 30xS detects the projection 30x). When the sensor output changes to HIGH level, the motor 32x is further rotated by one step in the direction CCW, and is stopped. This position is defined as the initial position of the motor 32x, i.e., the initial position of the X-direction cam 50. The initialization operation of the motor 32x (i.e., the initialization operation of the X-direction cam 50) has been described.

The initialization operation of the X-direction cam 50 has been described.

The initialization operation sequence of the Y-direction cam 40 will be briefly described below with reference to FIG. 26.

Since the initialization operation of the Y-direction cam 40 is basically the same as that of the X-direction cam 50, only a difference will be explained below. The difference is the number of driving steps of the stepping motor in the final step (S157 and S167) of initialization. More specifically, in step S157, the number of driving steps is one step, while in step S167, the number of driving steps is 16 steps. This is because the third embodiment of the present invention adopts the arrangement in which the vertical and horizontal components of the deflector 11 become parallel to the optical axis principal plane at the position separated by one step from the origin for the X-direction cam 50 and at the position separated by 16 steps from the origin for the Y-direction cam 40.

As described above, according to the third embodiment, the Y- and X-direction cams 40 and 50 are initialized using the outputs from the initial position sensor 30xS and an initial position sensor 30yS.

Figure 27:
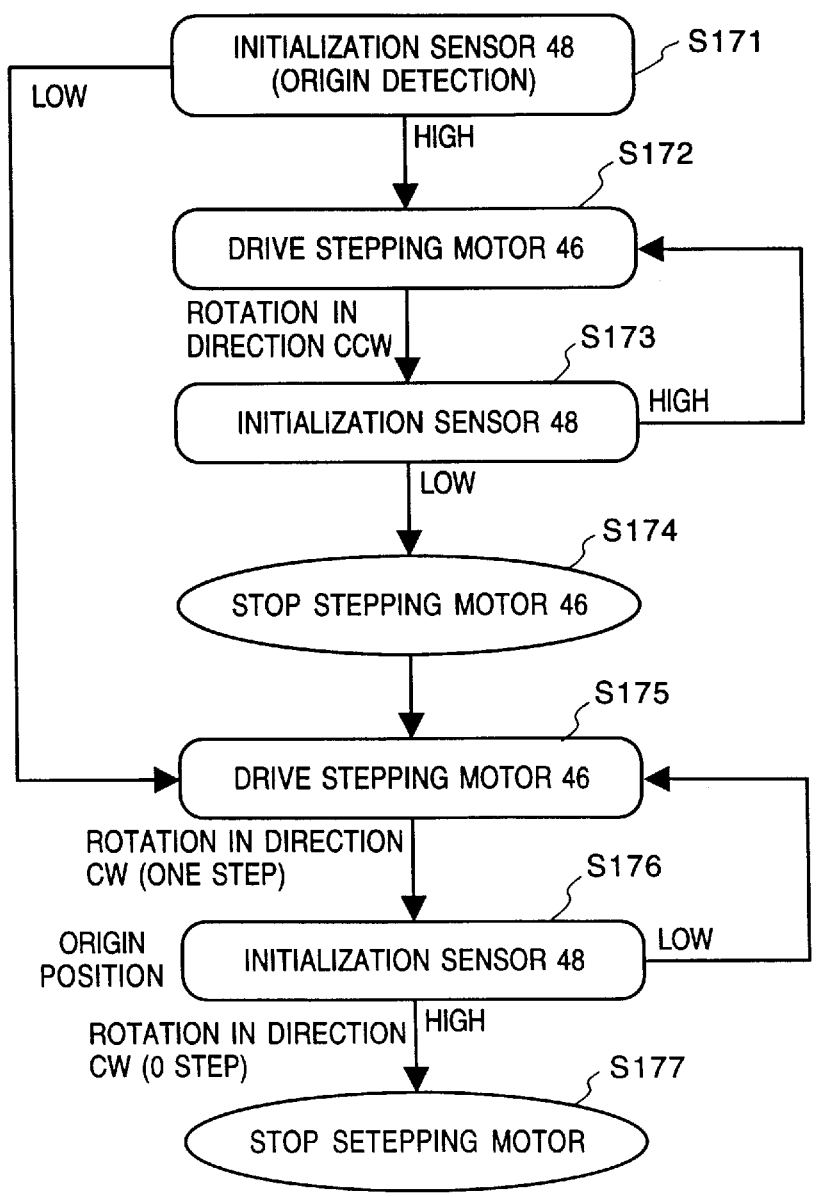
FIG. 27 is an initialization flow chart of an optical low-pass filter of the third embodiment.

The initialization operation of the filter rotation mechanism portion 5 of the third embodiment will be described below with reference to FIG. 27.

Note that the initial state of the rotation mechanism portion 5 means a state wherein the quartz plates 41 and 42 do not serve as a low-pass filter, i.e., the quartz plate 41 is located at the position shown in FIG. 11A.

When the power supply is turned on, it is checked in step S171 if the output LS from the initialization sensor 48 is at HIGH or LOW level. If the output LS is at LOW level (the initialization sensor 48 detects the projection 47), the flow advances to step S175, and the stepping motor 46 is rotated in the direction CW until the sensor output LS changes to HIGH level in step S175→step S176→step S175. If it is detected that the sensor output LS changes to HIGH level, the stepping motor 46 is rotated by one step in the direction CW, and the system controller COM recognizes this position as an origin position. This state corresponds to the state shown in FIG. 11A, and the cut-off frequency of the quartz plates 41 and 42 is relatively high.

In steps S172, S173, and S174, an operation for initializing the mechanism portion 5 when the motor 46 is excessively rotated is performed. More specifically, if it is determined in step S171 that the sensor output LS is at HIGH level, the flow advances to step S172, and the motor 46 is rotated in the direction CCW until the sensor output LS changes to LOW level in step S172→step S173. If the sensor LS changes to LOW level, the above-mentioned sequence is executed in steps S175 and S176.

Upon completion of the above-mentioned initialization operation, a correlation between the number of driving pulses of the stepping motor 46 and the rotation phase of the movable quartz plate 41 is established, and the cut-off frequency band can be arbitrarily changed by controlling the number of steps of the stepping motor 46. More specifically, as shown in FIG. 13B of the first embodiment, when the quartz plate 41 is located at the position of 135° (FIG. 11A), the quartz plates serve as a wide-band low-pass filter; when the quartz plate 41 is located at the position of 180° (FIG. 11C), the quartz plates serve as a narrow-band low-pass filter.

The control sequence for fetching an image by performing a pixel displacement will be described below with reference to FIGS. 28, 29, and 30. FIG. 28 shows the control sequence for the motors 32x and 32y, which is executed by the system controller COM. FIG. 30 shows the shift direction of pixels in the pixel displacement operation of the third embodiment.

Upon comparison between FIG. 15 of the first embodiment and FIG. 30 of the third embodiment, the displacement direction of the pixel displacement of the third embodiment can be understood. More specifically, as shown in FIG. 30, the pixel displacement is performed in the order of pixel positions 1→2→3→4→5→6→7→8→9→10→11→12→13→14→15→16. More specifically, in the third embodiment, all the pixel displacement directions for the first to fourth columns are upward directions in FIG. 30, while in the first embodiment, the pixel displacement directions for the first to fourth columns are respectively upward, downward, upward, and downward directions. Note that the difference between the pixel displacement directions of the first and third embodiments will be described later.

Assume that the pixel displacement in the X-direction is performed to the left in FIG. 30 when the cam lift amount of the X-direction cam 50 decreases, and the pixel displacement in the Y-direction is performed upward when the cam lift amount of the Y-direction cam 40 increases. In order to attain the pixel displacement operation shown in FIG. 30, the cam face F1 of the X-direction cam 50 is maintained and the cam face of the Y-direction cam 40 changes like F4→F3→F2→F1 at the image fetching positions N=1 to 4; the cam face F2 of the X-direction cam 50 is maintained and the cam face of the Y-direction cam 40 changes like F5→F4→F3→F2 at the image fetching positions N=5 to 8; the cam face F3 of the X-direction cam 50 is maintained and the cam face of the Y-direction cam 40 changes like F6→F5→F4 →F3 at the image fetching positions N=9 to 12; and the cam face F4 of the X-direction cam 50 is maintained and the cam face of the Y-direction cam 40 changes like F7→F6→F5→F4 at the image fetching positions N=13 to 16, as shown in FIG. 29. Therefore, in the pixel displacement operation of the third embodiment, the cam faces F5 to F7 of the X-direction cam 50 are not used.

FIG. 28 shows the control sequence for performing the pixel displacement shown in FIGS. 29 and 30.

Referring to FIG. 28, step S181 is the image fetching start step after initialization. Upon completion of initialization, the X-direction cam 50 stops at a position moved by one step from the origin position, and the Y-direction cam 40 stops at a position moved by 16 steps from the origin position. At these positions, the deflector 11 is parallel to the optical axis principal plane. The filter rotation mechanism portion 5 is set in the high image-quality mode, i.e., the quartz plate 41 is set at the position shown in FIG. 11C.

The loop of steps S182→step S183 executes the sequence for performing the pixel displacement in the column direction in FIG. 30 using the Y-direction cam 40 by driving the Y-cam stepping motor 32y by 5 steps (while the X-cam stepping motor 32x stands still). Upon completion of the pixel displacement for one column, the Y-cam motor 32y is stopped in step S184, is reversed by 20 steps in the CCW direction in step S185, and is stopped in step S186. With this operation, the pixel position moves downward by four pixels in the Y-direction. The X-cam motor 32x is rotated by five steps in the CCW direction in step S187, and is then stopped in step S188. With this operation, a one-pixel displacement in the X-direction is attained.

The operations in steps S182 to S188 are performed for the remaining three columns. In this manner, the cam operations shown in FIG. 29 are performed, and the pixel displacement operation shown in FIG. 30 is executed.

In step S189 in FIG. 28, the X-cam motor 32x is reversed by 15 steps to be returned to the origin position after fetching of image information for 16 surfaces in steps S182 to S188.

A system is programmed, so that the system controller COM synthesizes these pieces of information on the memory MEM, and outputs a synthesized image upon completion of fetching of image information for 16 surfaces.

In the third embodiment, a cam interference occurs as in the first embodiment since the driving operations, in the vertical and horizontal directions, of the deflector 11 are not completely independent from each other, and the vertical component changes upon driving of the deflector in the horizontal direction. In order to compensate for this interference, as shown in FIG. 29, each time the cam face of the X-direction cam 50 changes, the cam face of the Y-direction cam 40 is lowered by one extra step. In order to attain this compensation operation, in the third embodiment, the Y-direction cam 40 has seven cam faces F1 to F7.

More specifically, when the Y-direction cam 40 is returned upon completion of the shift operation in the Y-direction for the first column, the shift operation for the second column is started from a position further shifted by one step of the cam surface. When the shift start position of the Y-direction cam 40 is displaced, the shift of the vertical position of the deflector 11 upon movement of the X-direction cam 50 can be compensated for, and an accurate image fetching operation can be performed.

With this compensation operation, in the third embodiment, the cam pin 15 need not be arranged on the axis B serving as the rotation axis, in the vertical direction, of the deflector 11, and the cam pins 15 and 19, and the X- and Y-direction cams 50 and 40 can be concentrated on one place.

In consideration of the length of the cam pin 15 and the dispositions of the cams, since the compensation amount of the Y-direction cam 40 upon rotation of the X-direction cam 50 is set to be equal to the cam lift amount for one step of each cam, the X- and Y-direction cams 50 and 40 can have the same shape.

In the state shown in FIG. 22, the cam surfaces of both the cams are located at the position of F3, i.e., the cam lift amount is T3, and the 12th (N=12) image fetching operation is performed.

In the third embodiment, furthermore, since the minimum stepwise change amount of the cam lift amount for the pixel displacement is matched with the minimum change amount on the compensation region, the X- and Y-direction cams 50 and 40 can have the same shape, and hence, common parts can be used.

In this embodiment, a high resolution is attained by a pixel displacement operation in units of a 0.5 pixel. Of course, a pixel displacement in units of one pixel can be attained without changing the basic arrangement.

When the numbers of divisions of the X- and Y-direction cams 50 and 40 are appropriately set, a pixel displacement system with a higher resolution such as a 0.25 pixel, 0.1 pixel, and the like can be realized.

Figure 31A:
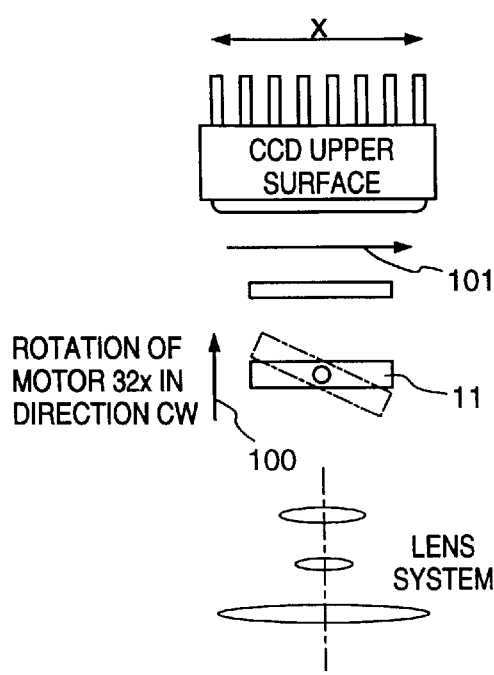
FIG. 31A is a view showing the relationship between the driving direction of a motor 32x and a deflector 11, and X-direction pixel displacement in the third embodiment.
Figure 31B:
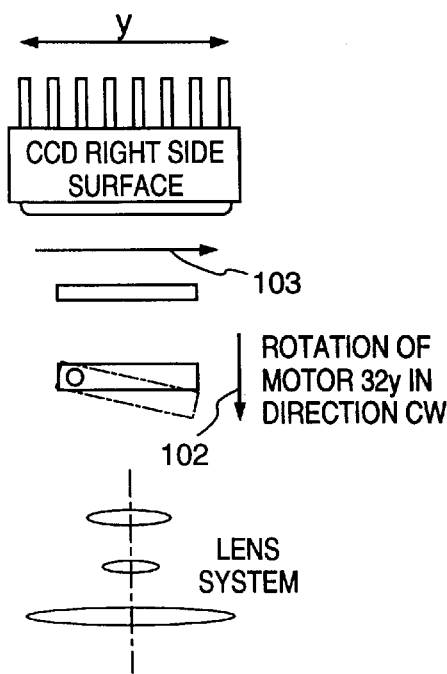
FIG. 31B is a view showing the relationship between the driving direction of a motor 32y and the deflector 11 and Y-direction pixel displacement in the third embodiment.
Figure 31C:
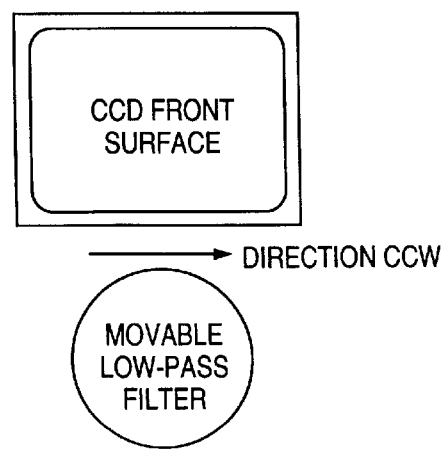
FIG. 31C is a view showing the relationship between the driving directions of a motor 46 and the low-pass filter.

FIG. 31A shows the relationship between the rotation, in the direction CW, of the X-cam motor 32x and the pixel displacement in the X-direction. FIG. 31B shows the relationship between the rotation, in the direction CW, of the Y-cam motor 32y and the pixel displacement in the Y-direction. Similarly, FIG. 31C shows the operation of the filter rotation mechanism portion 5 in the third embodiment.

Figure 32:
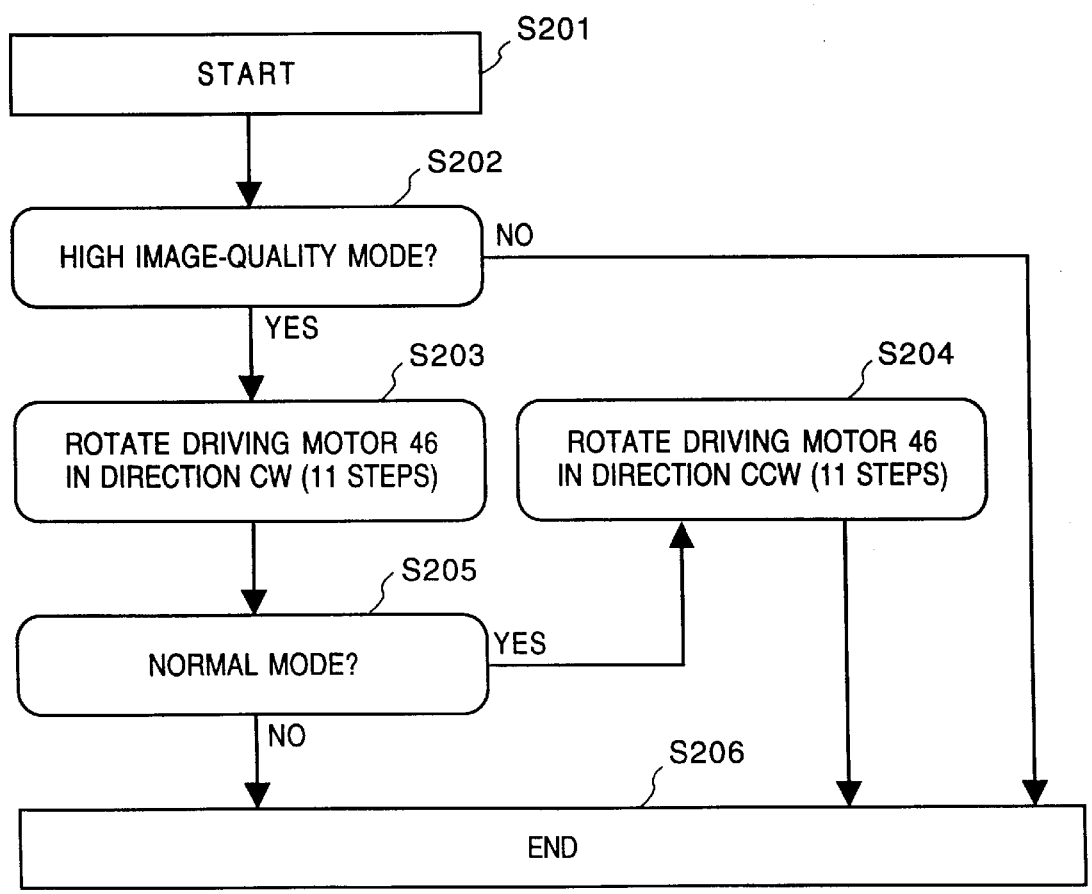
FIG. 32 is a flow chart showing the rotation operation of the optical low-pass filter of the third embodiment.

FIG. 32 is a flow chart showing the control sequence of the rotation mechanism portion 5 in the third embodiment. The control sequence is the same as that shown in FIG. 17 in the first embodiment.

Therefore, in the third embodiment, accurate adjustment can be attained when the cut-off frequency band of the optical low-pass filter is widened to generate moiré by utilizing the switching operation of the quartz plate 41 in focus adjustment so as to perform fine focus adjustment.

Upon comparison between the first and third embodiments, as shown in FIGS. 15 and 30, the pixel displacement directions are different from each other. This is because the third embodiment has as its one object to simplify the control sequence in FIG. 28. Therefore, in the third embodiment as well, the pixel displacement order shown in FIG. 15 can be realized using the Y- and X-direction cams 40 and 50. In this case, in the flow chart shown in FIG. 28, an operation of "image fetching"→"rotation, in direction CW, of Y-cam motor 32y (by five steps)" is repeated four times, thereafter, an operation of "stop Y-cam motor 32y"→"rotation, in direction CCW, of X-cam motor 32x (five steps)" is performed, and furthermore, an operation of "image fetching"→"rotation, in direction CCW, of Y-cam motor 32y (by five steps)" is repeated four times. With these operations, the image fetching operations for two columns (i.e., fetching of eight images) are completed, and the same processing is repeated for the third and fourth columns.

As can be seen from the above description, the pixel displacement shown in FIG. 15 can be realized in the third embodiment although the control is complicated.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having image sensing means for converting an optical image input via lenses into an electrical signal, comprising:

a light deflector arranged in front of said image sensing means, for changing an optical path of an optical image incident via said lenses by transmitting the optical image therethrough, said deflector being rotatably held about a first axis parallel to a vertical direction of an image sensing surface of said image sensing means and about a second axis parallel to a horizontal direction of the image sensing surface of said image sensing means, and guiding the optical image transmitted therethrough to the image sensing surface of said image sensing means;

driving force generating means for generating a driving force required for rotating said light deflector about the first and second axes;

first transmission means for transmitting a force by converting the driving force generated by said driving force generation means into an operation for rotating said light deflector about the first axis; and second transmission means for transmitting a force by converting the driving force generated by said driving force generation means into an operation for rotating said light deflector about the second axis, wherein said first and second transmission means are disposed at a same side with respect to one of the first and second axes.

2. The apparatus according to claim 1, wherein said driving force generation means comprises a single motor, said first transmission means comprises:
a first cam engaging with an output shaft of said motor;
a first cam surface formed on said first cam; and
first cam engaging means which is in sliding contact with said first cam surface and rotates said light deflector about the first axis, and said second transmission means comprises:
a second cam engaging with the output shaft of said motor;
a second cam surface formed on said second cam; and
second cam engaging means which is in sliding contact with said second cam surface and rotates said light deflector about the second axis.

3. The apparatus according to claim 1, wherein said first and second cam surfaces are formed to compensate for an interference between rotations, about the first and second axes, of said light deflector.

4. The apparatus according to claim 3, wherein said first and second transmission means comprise:

first and second cam surfaces formed on a single cam coupled to said driving force generation means; and first and second cam engaging pins which are respectively in sliding contact with said first and second cam surfaces and rotate said light deflector about the first and second axes, and said light deflector is driven stepwise in the vertical and horizontal directions, and a mutual influence between the operations in the vertical and horizontal directions is corrected.

5. The apparatus according to claim 4, wherein said first and second cam surfaces are formed to compensate for an interference between rotations, about the first and second axes, of said light deflector.

6. The apparatus according to claim 3, wherein said second cam surface has a cam lift having the same rotation amount as an interference rotation in order to cancel the interference rotation about the second axis of said second cam engaging means, said interference rotation being generated when said first cam is rotated by a predetermined amount by slidably moving said first cam engaging means along said first cam surface to rotate said light deflector about the first axis by a target rotation amount for the purpose of increasing optical image information.

7. The apparatus according to claim 5, wherein said second cam surface has a cam lift having the same rotation amount as an interference rotation in order to cancel the interference rotation about the second axis of said second cam engaging means, said interference rotation being generated when said first cam is rotated by a predetermined amount by slidably moving said first cam engaging means along said first cam surface to rotate said light deflector about the first axis by a target rotation amount for the purpose of increasing optical image information.

8. The apparatus according to claim 1, further comprising optical low-pass filter means for limiting a spatial frequency of optical image information incident on said image sensing means, and wherein said optical low-pass filter means is held to be rotatable substantially about an optical axis as a center.

9. The apparatus according to claim 8, further comprising: means for rotating said optical low-pass filter means, whereby a cut-off frequency characteristic of a low-pass filter is changed by rotating said optical low-pass filter means.

10. The apparatus according to claim 9, wherein a rotation angle of said optical low-pass filter means is controlled in correspondence with a displacement amount of said light deflector.

11. The apparatus according to claim 3, wherein said light deflector is held by a first holding member which allows said light deflector to be rotatable about the first axis, said first holding member is held by a second holding member which holds said first holding member to be rotatable about the second axis, and a rotation, about the second axis, of said first holding member generates the interference.

12. The apparatus according to claim 11, wherein a notch is formed on said first holding member to avoid an interference with said second holding member.

13. An image sensing apparatus having image sensing means for converting an optical image input via lenses into an electrical signal, comprising:

displacing means, disposed to be rotatable about a first axis parallel to a vertical direction of an image sensing surface of said image sensing means and to be rotatable about a second axis parallel to a horizontal direction of the image sensing surface of said image sensing means, for displacing an imaging position of the optical image incident via said lenses on the image sensing surface of said image sensing means;

driving force generation means for generating a driving force required for rotating said displacing means about the first and second axes;

first transmission means for transmitting a force by converting a driving force generated by said driving force generation means into a rotating force for rotating said displacing means about the first axis;

second transmission means for transmitting a force by converting a driving force generated by said driving force generation means into a rotating force for rotating said displacing means about the second axis; and control means for increasing optical image information by rotating said displacing means about the first and second axis by an amount of degrees which is predetermined in correspondence with the numbers of vertical and horizontal pixels of said image sensing means, wherein said first and second transmission means are disposed at a same side with respect to one of the first and second axes.

14. The apparatus according to claim 13, wherein said control means comprises a first cam for driving said displacing means in the vertical direction, and a second cam for driving said displacing means in the horizontal direction, and said first and second cams have an identical shape.

15. The apparatus according to claim 14, wherein said first and second cams are formed so that a change amount of a first cam surface for defining a rotation about one axis matches a change amount of a second cam surface for defining a rotation about the other axis.

16. The apparatus according to claim 13, further comprising optical low-pass filter means for limiting a spatial frequency of the optical image information incident on said image sensing means, and wherein said optical low-pass filter means is held to be rotatable substantially about an optical axis as a center.

17. An image sensing apparatus having image sensing means for converting an optical image input via lenses into an electrical signal, comprising:

a light deflector, arranged in front of said image sensing means, for changing an optical path of an optical image incident via said lenses by transmitting the optical image, and guiding the optical image transmitted therethrough to an image sensing surface of said image sensing means, said deflector being held to be rotatable about a first axis parallel to a vertical direction of an image sensing surface of said image sensing means and to be rotatable about a second axis parallel to a horizontal direction of the image sensing surface of said image sensing means;

first and second cam engaging means for driving said light deflector by engaging with cam surfaces;

cam means having first and second cam surfaces which respectively engage with said first and second cam engaging means so as to rotate said light deflector about the first and second axes; and control means for controlling said cam means to rotate said light deflector about the first and second axes by an amount of degrees so as to deflect an optical path of the optical image to be incident on said image sensing means for the purpose of increasing optical image information obtained by said image sensing means, wherein the first and second cam surfaces are formed to compensate for an interference between rotations, about the first and second axes, of said light deflector.

18. The apparatus according to claim 17, wherein said light deflector comprises a glass plate having two parallel surfaces consisting of a transparent material.

19. The apparatus according to claim 17, wherein said cam means comprises a first cam formed with the first cam surface, and a second cam formed with the second cam surface.

20. The apparatus according to claim 19, wherein the first cam surface has the same cam surface shape as the second cam surface.

21. The apparatus according to claim 17, wherein said cam means comprises a third cam formed with the first and second cam surfaces.

22. The apparatus according to claim 21, wherein said first and second cam engaging means are disposed to be parallel and close to each other, the first cam surface engaging with said first cam engaging means has a plurality of first resting cam surfaces, and the second cam surface engaging with said second cam engaging means has a plurality of second resting cam surfaces, and each of the plurality of first resting cam surfaces and each of the plurality of second resting cam surfaces are alternately formed on said third cam.

23. The apparatus according to claim 17, wherein the first and second cam surfaces have a plurality of resting cam surfaces which change stepwise.

24. The apparatus according to claim 23, wherein said second cam surface has a cam lift having the same rotation amount as an interference rotation in order to cancel the interference rotation about the second axis of said second cam engaging means, said interference rotation being generated when said first cam is rotated by a predetermined amount by slidably moving said first cam engaging means along said first cam surface to rotate said light deflector about the first axis by a target rotation amount for the purpose of increasing optical image information.

25. The apparatus according to claim 17, further comprising optical low-pass filter means for limiting a spatial frequency of optical image information incident on said image sensing means, and wherein said optical low-pass filter means is held to be rotatable substantially about an optical axis as a center.

26. The apparatus according to claim 25, further comprising means for rotating said optical low-pass filter means, whereby a cut-off frequency characteristic of a low-pass filter is changed by rotating said optical low-pass filter means.

27. The apparatus according to claim 26, wherein said control means controls a rotation angle of said optical low-pass filter means in correspondence with a displacement amount of said light deflector.

28. The apparatus according to claim 17, wherein said light deflector is held by a first holding member which allows said light deflector to be rotatable about the first axis, said first holding member is held by a second holding member which holds said first holding member to be rotatable about the second axis, and a rotation, about the second axis, of said first holding member generates an interference between rotations about the first and second axes of said light deflector.

29. The apparatus according to claim 28, wherein a notch is formed on said first holding member to avoid an interference with said second holding member.

30. An image sensing apparatus having image sensing means for converting an optical image input via lenses into an electrical signal, comprising:

displacing means which is disposed to be rotatable about a first axis parallel to a vertical direction of an image sensing surface of said image sensing means and to be rotatable about a second axis parallel to a horizontal direction of the image sensing surface of said image sensing means, and displaces an imaging position of the optical image incident via said lenses on the image sensing surface of said image sensing means; and control means for increasing optical image information by rotating said displacing means about the first and second axes in correspondence with the numbers of vertical and horizontal pixels of said image sensing means, wherein said control means comprises a cam for rotating said displacing means about the first and second axes as centers of rotation, and said cam is formed with a plurality of cam surfaces for parallelly performing an operation for displacing said displacing means about one axis, and an operation for correcting an influence about the other axis with respect to said displacing means caused by the displacement operation about the one axis.

31. The apparatus according to claim 30, wherein said control means comprises a first cam for driving said displacing means in the vertical direction, and a second cam for driving said displacing means in the horizontal direction, and said first and second cams have an identical shape.

32. The apparatus according to claim 31, wherein said first and second cams are formed so that a change amount of a first cam surface for defining a rotation about one axis matches a change amount of a second cam surface for defining a rotation about the other axis.

33. The apparatus according to claim 30, further comprising optical low-pass filter means for limiting a spatial frequency of the optical image information incident on said image sensing means, and wherein said optical low-pass filter means is held to be rotatable substantially about an optical axis as a center.

34. An optical apparatus provided with lenses, comprising:

a light deflector arranged in front of an image sensing means, for changing an optical path of an optical image incident via said lenses by transmitting the optical image therethrough, said deflector being rotatably held about a first axis parallel to a vertical direction of an imaging sensing surface of said image sensing means and about a second axis parallel to a horizontal direction of the image sensing surface of said image sensing means, and guiding the optical image transmitted therethrough to the image sensing surface of said image sensing means;

driving force generating means for generating a driving force required for rotating said light deflector about the first and second axes;

first transmission means for transmitting a force by converting the driving force generated by said driving force generation means into an operation for rotating said light deflector about the first axis; and second transmission means for transmitting a force by converting the driving force generated by said driving force generation means into an operation for rotating said light deflector about the second axis, wherein said first and second transmission means are disposed at a same side with respect to one of the first and second axes.

35. The apparatus according to claim 34, wherein said driving force generation means comprises a single motor, said first transmission means comprises:
a first cam engaging with an output shaft of said motor;
a first cam surface formed on said first cam; and
first cam engaging means which is in sliding contact with said first cam surface and rotates said light deflector about the first axis, and said second transmission means comprises:
a second cam engaging with the output shaft of said motor;
a second cam surface formed on said second cam; and
second cam engaging means which is in sliding contact with said second cam surface and rotates said light deflector about the second axis.

36. The apparatus according to claim 35, wherein said first and second cam surfaces are formed to compensate for an interference between rotations, about the first and second axes, of said light deflector.

37. The apparatus according to claim 34, wherein said first and second transmission means comprise:

first and second cam surfaces formed on a single cam coupled to said driving force generation means; and first and second cam engaging pins which are respectively in sliding contact with said first and second cam surfaces and rotate said light deflector about the first and second axes, and said light deflector is driven stepwise in the vertical and horizontal directions, and a mutual influence between the operations in the vertical and horizontal directions is corrected.

38. The apparatus according to claim 37, wherein said first and second cam surfaces are formed to compensate for an interference between rotations, about the first and second axes, of said light deflector.

39. The apparatus according to claim 36, wherein said second cam surface has a cam lift having the same rotation amount as an interference rotation in order to cancel the interference rotation about the second axis of said second cam engaging means, said interference rotation being generated when said first cam is rotated by a predetermined amount by slidably moving said first cam engaging means along said first cam surface to rotate said light deflector about the first axis by a target rotation amount for the purpose of increasing optical image information.

40. The apparatus according to claim 38, wherein said second cam surface has a cam lift having the same rotation amount as an interference rotation in order to cancel the interference rotation about the second axis of said second cam engaging means, said interference rotation being generated when said first cam is rotated by a predetermined amount by slidably moving said first cam engaging means along said first cam surface to rotate said light deflector about the first axis by a target rotation amount for the purpose of increasing optical image information.

* * * * *

UNITED STATES PATENT AND TRADEMARK OFFICE
CERTIFICATE OF CORRECTION

PATENT NO.   : 5,877,806
DATED        : March 2, 1999
INVENTOR(S)  : Kenji Kawano It is certified that error appears in the above-identified patent and that said Letters Patent is hereby corrected as shown below:

Title page,
Item [56], References Cited, U.S. PATENT DOCUMENTS, "5,386,628," issue date should read -- 4/1995 --
Item [57], ABSTRACT,
Line 1, please add -- There is disclosed -- in front of "An"

Column 1,
Line 65, please delete "a" and insert therefor -- $\underline{a}$ --

Column 2,
Line 19, please delete "a" and insert therefor -- $\underline{a}$ --

Column 3,
Line 1, please delete "≈" and insert therefor -- ≅ --

Column 26,
Line 8, after "axis"; please add -- and
control means for controlling said driving force generation means to change the optical path of the optical image to be incident on said image sensing means by rotating said light deflector about the first and second axes by an amount of degrees which is predetermined in correspondence with the numbers of vertical and horizontal pixels of said image sensing means, so as to increase optical image information, --

Column 26,
Line 28, please delete "1" and insert therefor -- 2 --
Line 32, please delete "3" and insert therefor -- 1 --

UNITED STATES PATENT AND TRADEMARK OFFICE
CERTIFICATE OF CORRECTION

PATENT NO.    : 5,877,806
DATED         : March 2, 1999
INVENTOR(S)   : Kenji Kawano It is certified that error appears in the above-identified patent and that said Letters Patent is hereby corrected as shown below:

Column 30,
Line 34, after "axis"; please add -- and
control means for controlling said driving force generation means to change the optical path of the optical image to be incident on said image sensing means by rotating said light deflector about the first and second axes by an amount of degrees which is predetermined in correspondence with the numbers of vertical and horizontal pixels of said image sensing means, so as to increase optical image information, --
Line 55, please delete "35" and insert therefor -- 34 --

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 5,877,806
DATED : March 2, 1999
INVENTOR(S) : Kenji Kawano

It is certified that error appears in the above-identified patent and that said Letters Patent is hereby corrected as shown below:

<u>Title page,</u>
Item [73], Assignee, please delete "Ohtsuka Patent Office, Tokyo, Japan." and insert -- Canon Kabushiki Kaisha, Tokyo Japan --.

Signed and Sealed this

Twenty-third Day of March, 2004

JON W. DUDAS
*Acting Director of the United States Patent and Trademark Office*